(12) United States Patent
Snyder et al.

(10) Patent No.: US 10,702,938 B1
(45) Date of Patent: Jul. 7, 2020

(54) TORCH

(71) Applicant: WORTHINGTON TORCH, LLC, Columbus, OH (US)

(72) Inventors: Micah Matthew Snyder, Westerville, OH (US); Jody Alan McKinley, Mount Vernon, OH (US)

(73) Assignee: WORTHINGTON TORCH LLC, Columbus, OH (US)

( * ) Notice: Subject to any disclaimer, the term of this patent is extended or adjusted under 35 U.S.C. 154(b) by 538 days.

(21) Appl. No.: 15/621,164

(22) Filed: Jun. 13, 2017

Related U.S. Application Data

(60) Provisional application No. 62/349,796, filed on Jun. 14, 2016.

(51) Int. Cl.
| | | |
|---|---|---|
| *B23K 3/00* | (2006.01) | |
| *B23K 3/02* | (2006.01) | |
| *B23K 5/00* | (2006.01) | |
| *B23K 7/00* | (2006.01) | |

(52) U.S. Cl.
CPC ............... *B23K 3/022* (2013.01); *B23K 5/00* (2013.01); *B23K 7/00* (2013.01)

(58) Field of Classification Search
CPC ............ B23K 3/021–023; B23K 3/043; B23K 5/00–24; B23K 7/00–107
USPC ................................................ 228/57, 101
See application file for complete search history.

(56) References Cited

U.S. PATENT DOCUMENTS

| | | | | |
|---|---|---|---|---|
| 4,348,172 | A | | 9/1982 | Miller |
| 4,469,311 | A | * | 9/1984 | Laing .................... B23K 7/107 266/67 |
| 4,572,483 | A | * | 2/1986 | Leu ......................... F23D 14/42 239/397.5 |
| 4,606,528 | A | * | 8/1986 | Zwicker ................. B23K 7/107 266/66 |
| 4,915,360 | A | * | 4/1990 | Goulet .................... F23D 14/42 239/407 |
| 5,383,650 | A | * | 1/1995 | Bissonnette ............ B23K 7/10 266/48 |
| 9,989,250 | B2 | * | 6/2018 | Wolfinger ................ F23N 3/002 |
| 2011/0053103 | A1 | | 3/2011 | Burdsall et al. |
| 2012/0074244 | A1 | * | 3/2012 | Burdsall .................. F23N 1/007 239/581.1 |
| 2014/0205957 | A1 | * | 7/2014 | Logan .................... B23K 37/006 431/18 |

* cited by examiner

*Primary Examiner* — Kiley S Stoner
(74) *Attorney, Agent, or Firm* — Tucker Ellis LLP; Carlos Garritano

(57) ABSTRACT

A torch includes a body that defines an interior cavity, and a fuel inlet connector secured to the body and disposed within the interior cavity. A regulator is disposed within the interior cavity and includes a regulator housing, a regulator valve and a regulator valve actuating device. An intake stem is secured to one of the fuel inlet connector and the regulator housing, and defines an intake flow passage. A burn tube is coupled with the body and defines a burn tube flow passage. A trigger is pivotally coupled with the body. The regulator valve opens as the trigger pivots between an off position and a full flow position, permitting a user to initiate and vary a flow of hydrocarbon fuel to the burn tube flow passage when the intake flow passage is in fluid communication with a source of hydrocarbon fuel, by varying the position of the trigger.

15 Claims, 29 Drawing Sheets

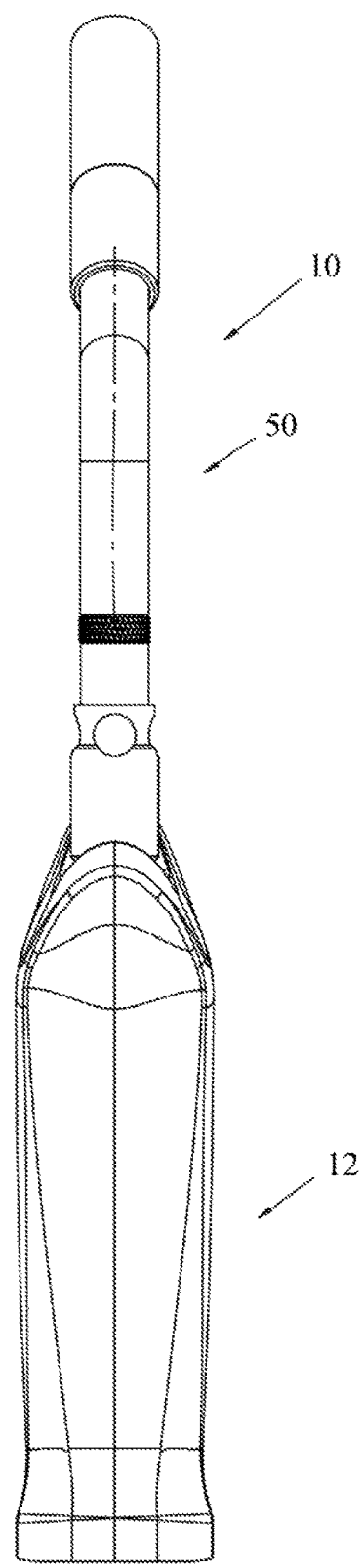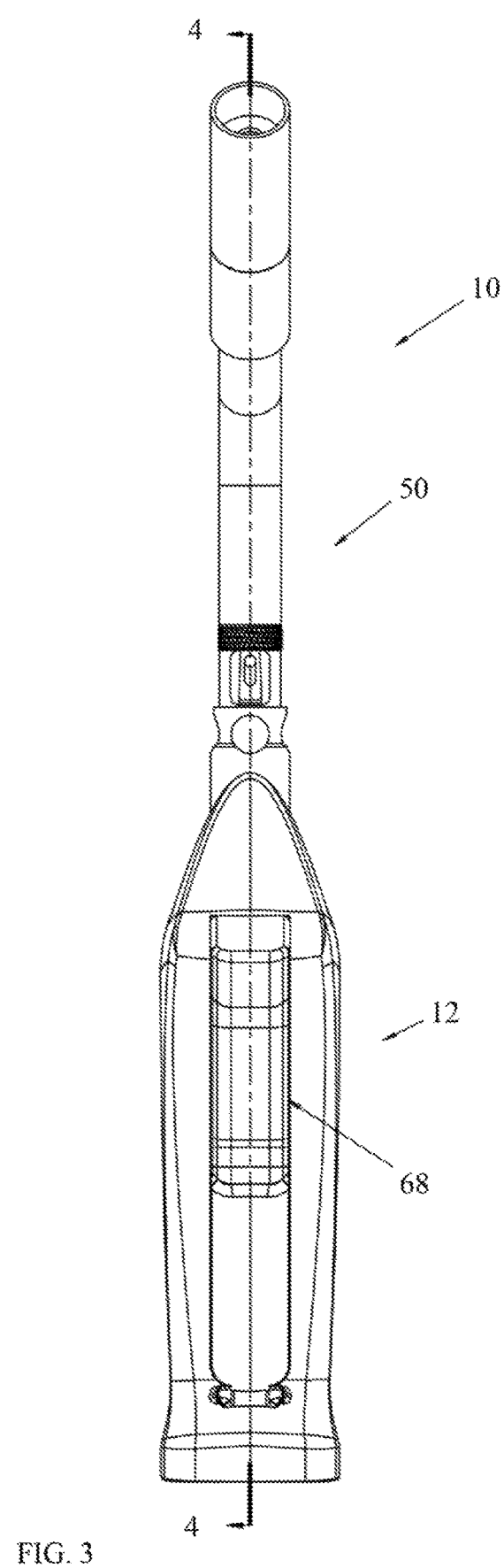
FIG. 2
FIG. 3

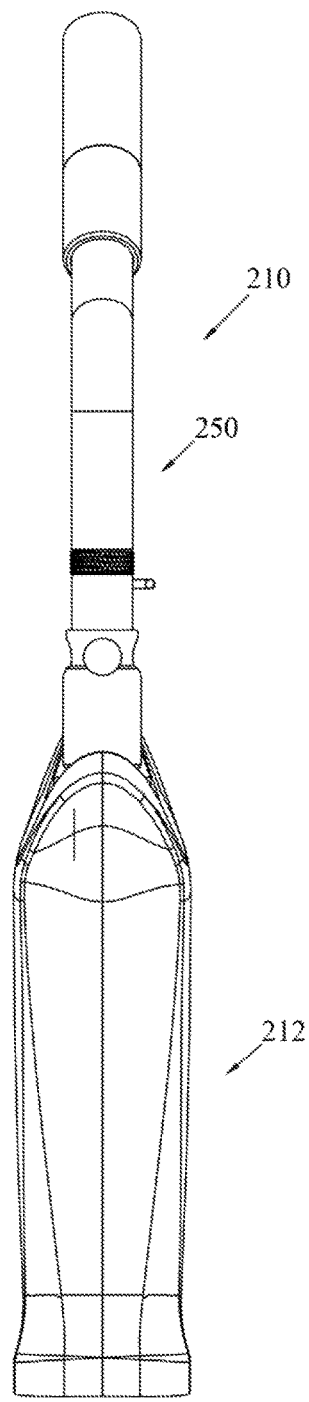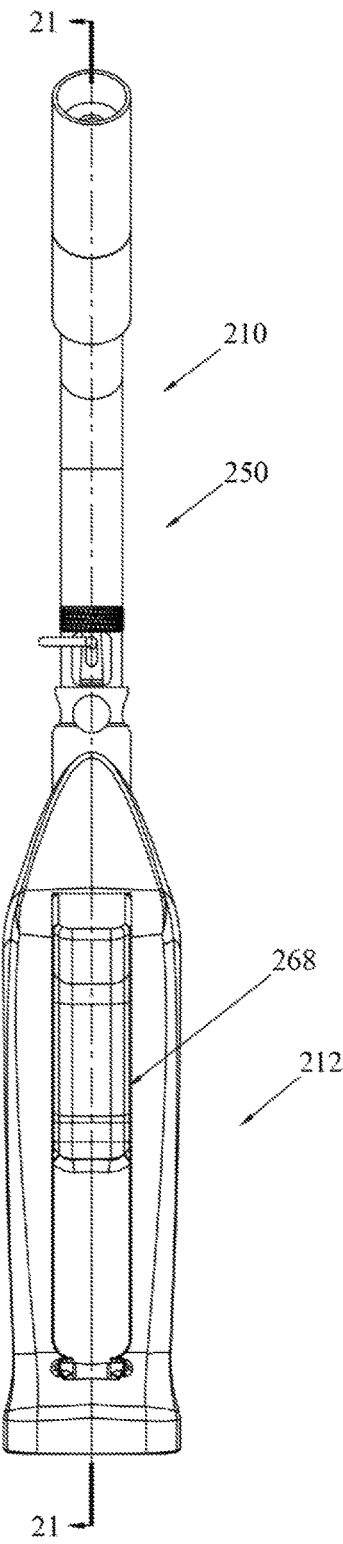
FIG. 19
FIG. 20

TORCH

CROSS-REFERENCE TO RELATED APPLICATION

This application claims the benefit of U.S. Provisional Patent Application No. 62/349,796, filed on Jun. 14, 2016, the disclosure of which is incorporated herein by reference.

TECHNICAL FIELD

This application relates generally to torches, and more particularly, to torches which can burn gaseous hydrocarbon fuels and can be used, for example, in soldering applications.

BACKGROUND

Gas-burning torches are used in various applications for applying localized intense heat. One such application is pipe soldering. Pipe soldering involves joining together components such as two pipes or two fittings, or a pipe and a fitting, through application of solder to the joint. In order to flow solder into the joint, a torch is used to heat the joint and/or the solder directly until the solder reaches its melting point. Once the solder becomes a liquid, it can then flow into the joint and, upon cooling, join and seal the components together.

Controlled application of heat to the joint is often desirable. A user of a conventional torch can control the application of heat by moving the torch into an out of proximity to the joint, such that the joint experiences intermittent heating until a desired level of heating is achieved. Another method of managing the application of heat to the joint is adjusting the size of the torch flame. Conventional torches used in this manner include those having a body, or housing, which defines an internal cavity that contains a pressure regulator and other components. Gaseous hydrocarbon fuel is supplied to the regulator when an upstream connector of the torch is connected to an external source of the fuel. The regulator is configured to at least partially restrict gas flow in a fuel line extending downstream from the regulator within the internal cavity. An on/off valve is positioned downstream of the regulator and upstream of a burn tube connected to the body of the torch. The on/off valve is configured to permit or stop gas flow through the fuel line as the user desires. A trigger is movably coupled with the body of the torch and is used to actuate the on/off valve to permit, or prevent, fuel flow to a burn tube of the torch. A controller, which includes a rotatable knob protruding through the body of the torch, is used to control the position of the regulator and the rate of fuel flow to the burn tube, and the size of the torch flame. Pipe soldering typically requires a person to use a first hand to hold the torch and a second hand to hold the solder. The rotatable knob can be difficult or awkward to rotate, for example with the thumb of the user's hand holding the torch. In this situation, to safely adjust the torch flame, a user may be required to set down the solder and use his/her second hand to rotate the knob to control the flame. This can be inconvenient, and can decrease worker efficiency.

SUMMARY

According to one embodiment, a torch includes a body defining an interior cavity, and a fuel inlet connector secured to the body and disposed within the interior cavity. The torch includes a regulator disposed within the interior cavity. The regulator includes a regulator housing defining a regulator chamber, and also includes a regulator valve and a regulator valve actuating device, each being disposed at least partially within the regulator chamber. The torch also includes an intake stem and a burn tube. The intake stem defines an intake flow passage and is secured to one of the fuel inlet connector and the regulator housing. The burn tube is coupled with the body and defines a burn tube flow passage. The torch further includes a trigger assembly, which includes a trigger pivotally coupled with the body, and a regulator spring connected to the trigger. The trigger is pivotable between an off position and a full flow position. The regulator chamber includes a fuel outlet zone in selective fluid communication with the intake flow passage and in fluid communication with the burn tube flow passage. The regulator spring urges the regulator valve actuating device against the regulator valve, to open the regulator valve, as the trigger pivots between the off position and the full flow position, permitting a user to initiate and vary a flow of hydrocarbon fuel to the burn tube flow passage when the intake flow passage is in fluid communication with a source of hydrocarbon fuel, by varying the position of the trigger.

According to another embodiment, a torch includes a body that defines an interior cavity. The torch also includes a fuel inlet connector secured to the body and a regulator, with each of the fuel inlet connector and the regulator being disposed within the interior cavity. The regulator includes a regulator housing defining a regulator chamber, and further includes a regulator valve and a regulator valve actuating device. The torch includes an intake stem that defines an intake flow passage and is secured to one of the fuel inlet connector and the regulator housing. The torch also includes a burn tube and a trigger assembly. The burn tube is coupled with the body and defines a burn tube flow passage. The trigger assembly includes a trigger pivotally coupled with the body, and pivotable between an off position and a full flow position. The regulator chamber includes a fuel outlet zone that is in selective fluid communication with the intake flow passage and is in fluid communication with the burn tube flow passage. The regulator valve actuating device includes a piston. The regulator valve and the piston are disposed in a confronting relationship, and the piston is movable relative to the regulator housing. The regulator valve actuating device further includes a first O-ring and a second O-ring. Each of the first O-ring and the second O-ring surrounds the piston and is in sealing engagement with the regulator housing. The piston is urged against the regulator valve, to open the regulator valve, as the trigger pivots between the off position and the full flow position, permitting a user to initiate and vary a fuel flow through the burn tube flow passage, when the intake flow passage is in fluid communication with a source of hydrocarbon fuel, by varying the position of the trigger.

BRIEF DESCRIPTION OF THE DRAWINGS

FIG. 2 is a top plan view of the torch of FIG. 1;

FIG. 3 is a bottom plan view of the torch of FIG. 1;

FIG. 19 is a top plan view of the torch of FIG. 18;

FIG. 20 is a bottom plan view of the torch of FIG. 18;

DETAILED DESCRIPTION

Figure 1:
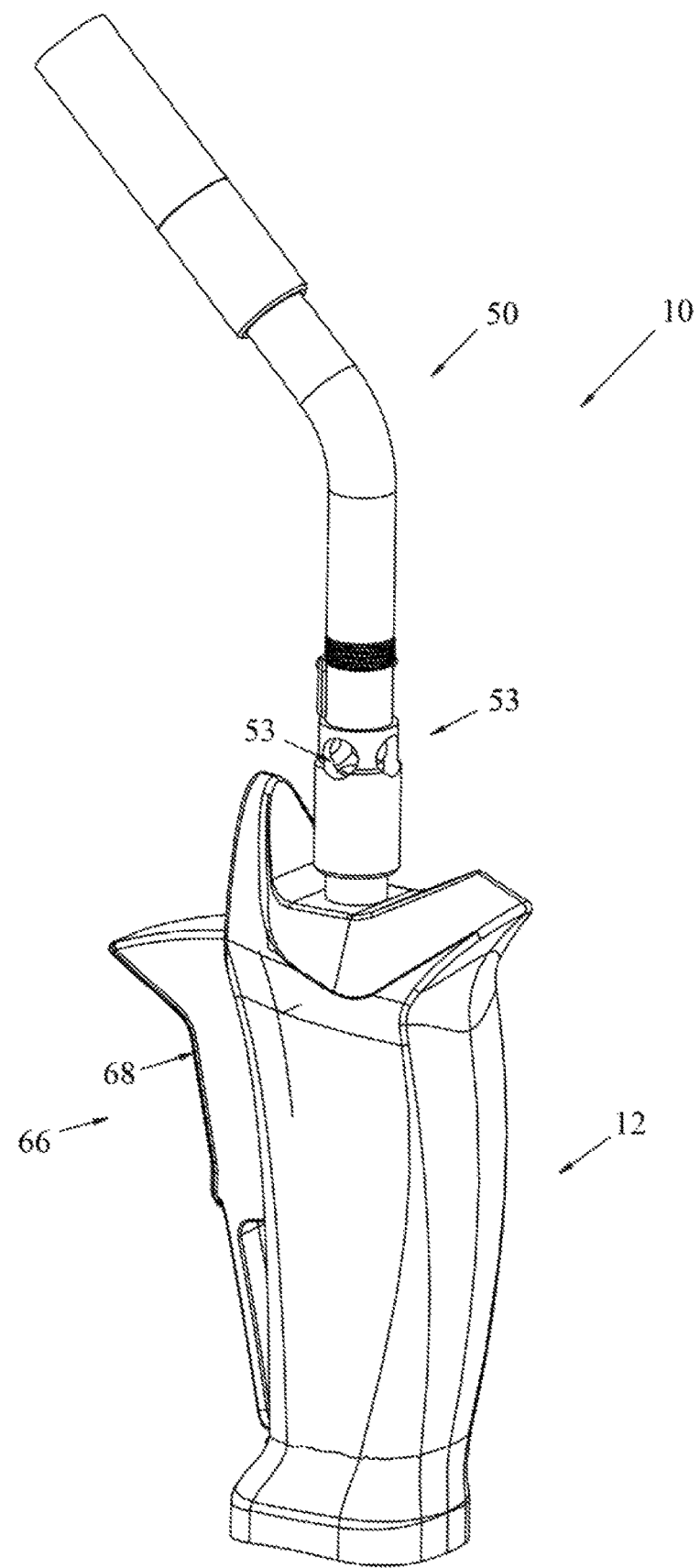
FIG. 1 is a perspective view of a torch according to one embodiment.

Referring to the drawings, wherein like reference numbers indicate the same or corresponding elements throughout the views, FIGS. 1-9 illustrate a torch 10 according to one embodiment. The torch 10 can include a body 12, which can define an interior cavity 14 and can define a body longitudinal axis 15. The body 12 can be formed in two halves to facilitate the assembly of various components within the interior cavity 14. For example, the torch 10 can include a regulator 16 and an igniter 18, with each of the regulator 16 and the igniter 18 being disposed within the interior cavity 14. The body 12 can include various ribs and/or other support structures (not shown) positioned within the interior cavity 14, which can be configured to support the regulator 16 and the igniter 18. The regulator 16 and the igniter 18 can include various features, such as ridges, grooves, protrusions and/or indentations (not shown), or other features or combinations of features, to mate with the supporting structures.

The torch 10 can include a fuel inlet connector 20, which can define a connector cavity 21 and can be disposed within the interior cavity 14. The fuel inlet connector 20 can be configured to be coupled with a source of hydrocarbon fuel, e.g., a cylindrical tank (not shown), or other container, containing a hydrocarbon gas such as propane or propylene. Alternatively, the fuel inlet connector 20 can be configured for coupling with a conduit (not shown), e.g., a flexible hose, connected to a container. The fuel inlet connector 20 can include a bushing, which can be a CGA 600 bushing, secured to the body 12 of the torch 10. An intake stem 22 can be secured to the fuel inlet connector 20 and can extend through the connector cavity 21. The intake stem 22 can define an intake flow passage 24. The intake stem 22 can be configured so that it opens a valve, which can have an industry-standard configuration, within the source of hydrocarbon fuel when the fuel inlet connector 20 is coupled with the source of hydrocarbon fuel. This can provide fluid communication between the intake flow passage 24 (FIG. 6) and a chamber, cavity, or passage defined by the source of hydrocarbon fuel, which can contain a gaseous hydrocarbon fuel such as propane or propylene.

Figure 4:
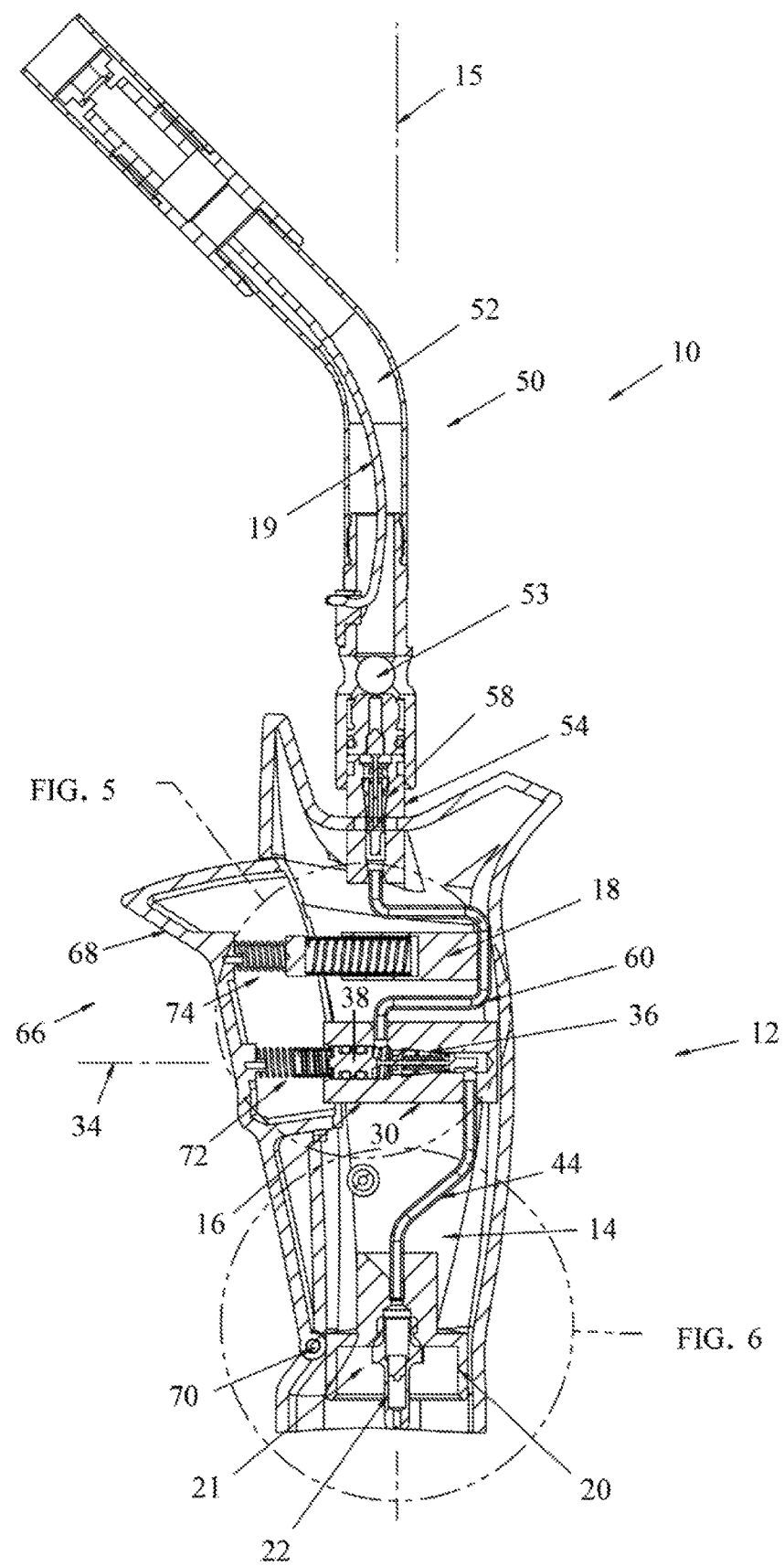
FIG. 4 is a cross-sectional view taken along line 4-4 in FIG. 3, with a trigger of the torch of FIG. 1 depicted in an off position.
Figure 5:
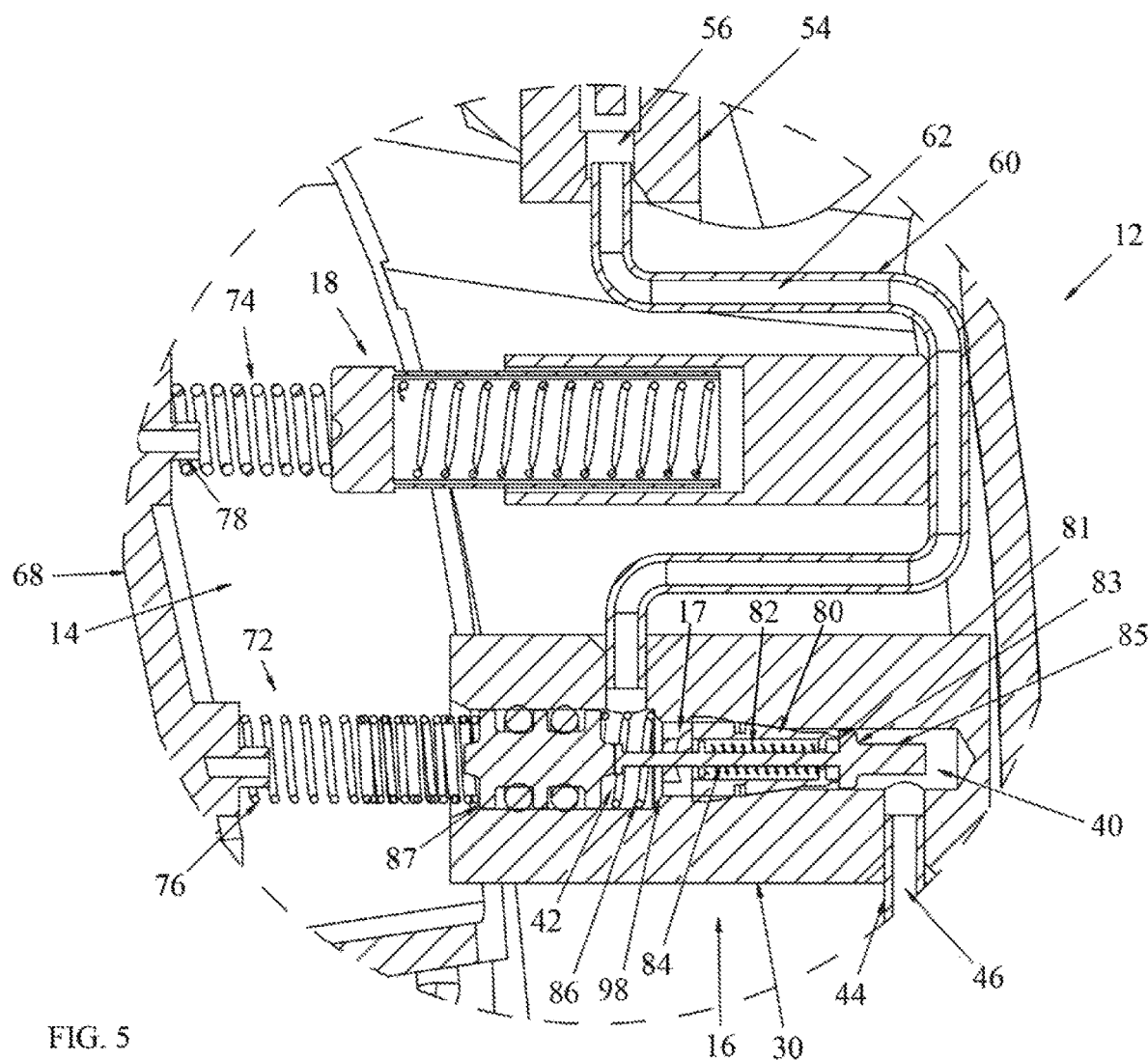
FIG. 5 is an enlarged view of an encircled portion of FIG. 4.
Figure 6:
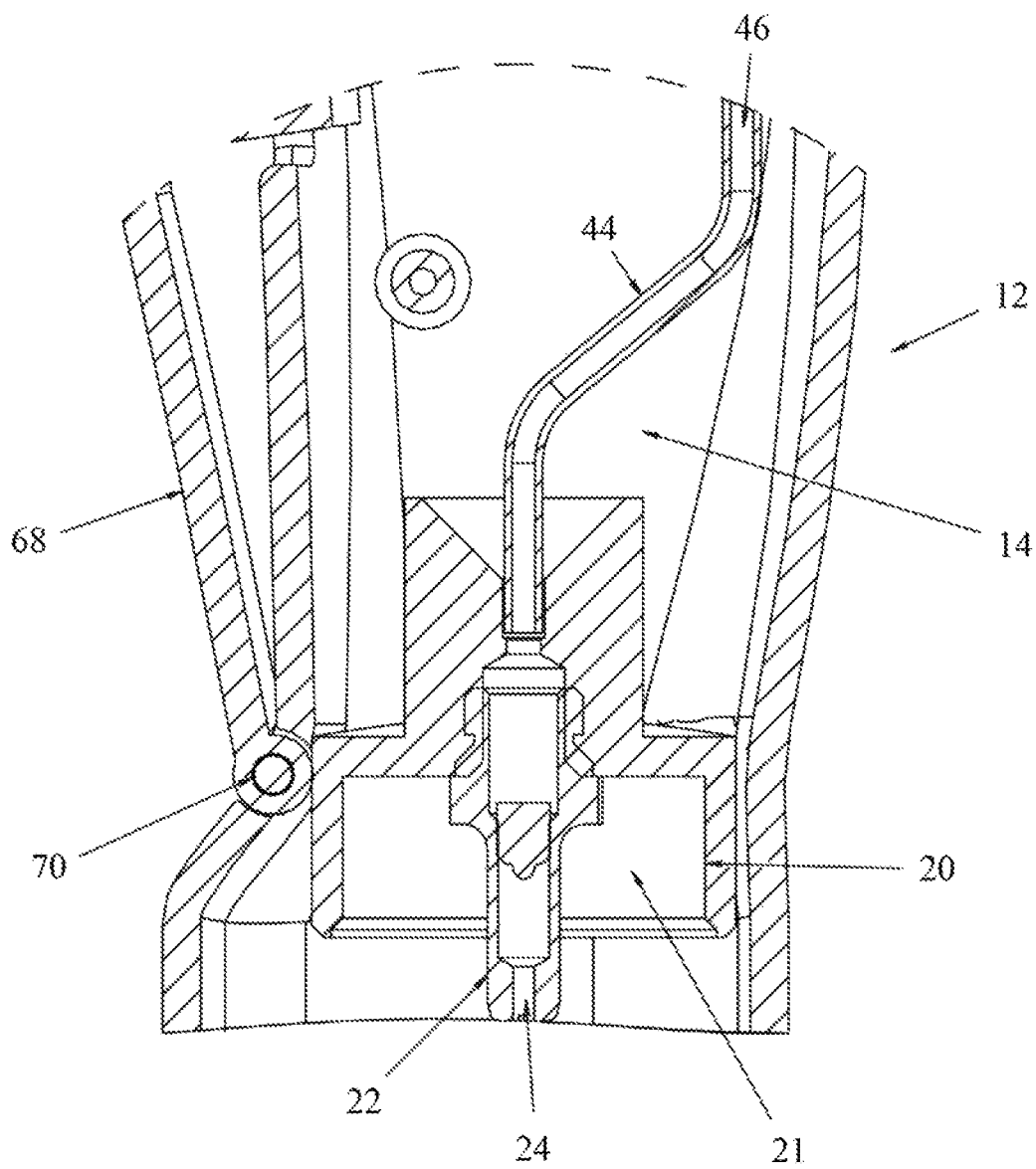
FIG. 6 is an enlarged view of another encircled portion of FIG. 4.
Figure 7:
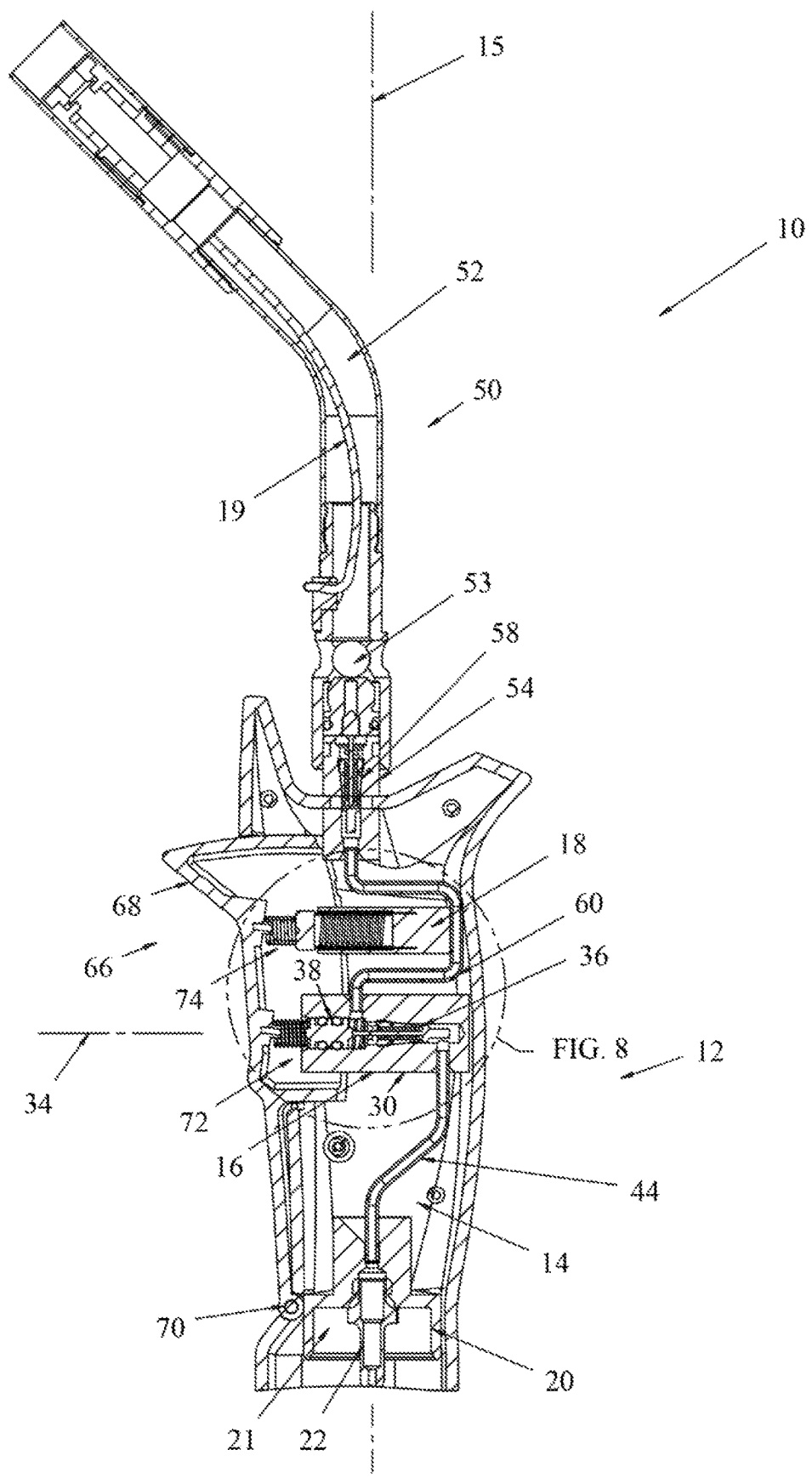
FIG. 7 is a cross-sectional view similar to FIG. 4, but with the trigger depicted in a full flow position.
Figure 8:
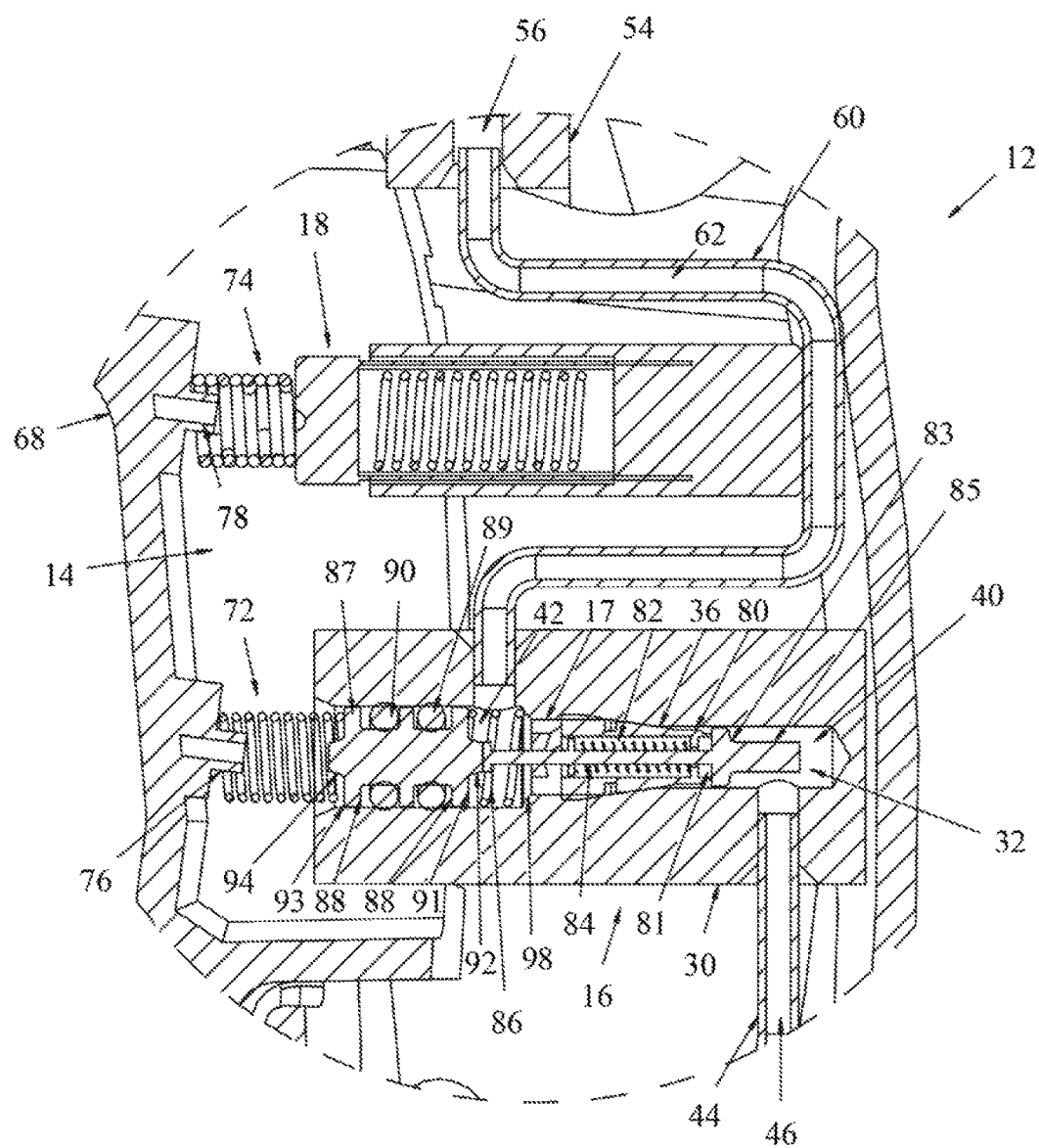
FIG. 8 is an enlarged view of an encircled portion of FIG. 7.
Figure 9:
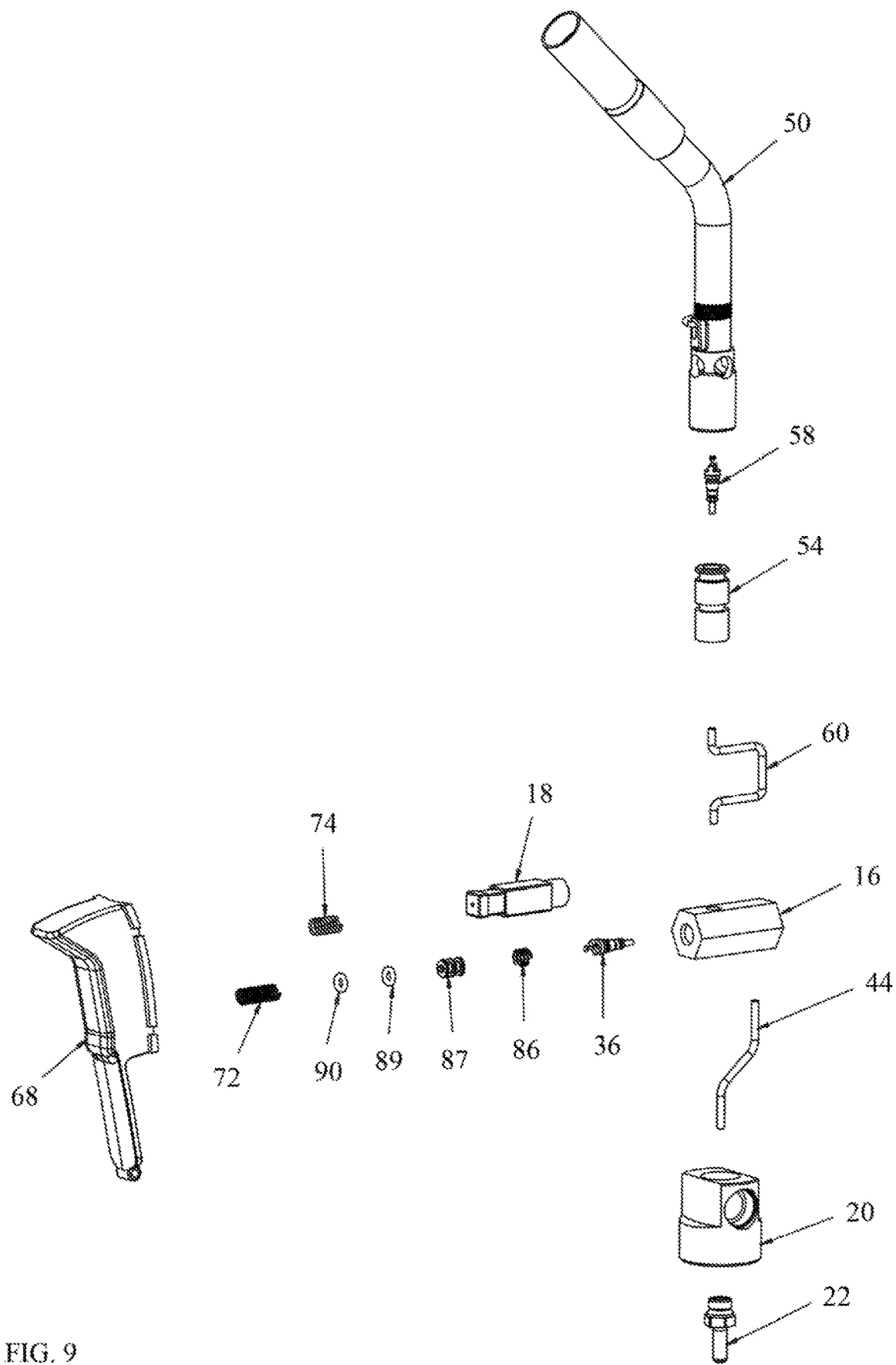
FIG. 9 is an exploded perspective view of the torch of FIG. 1, with a body of the torch omitted.
Figure 10:
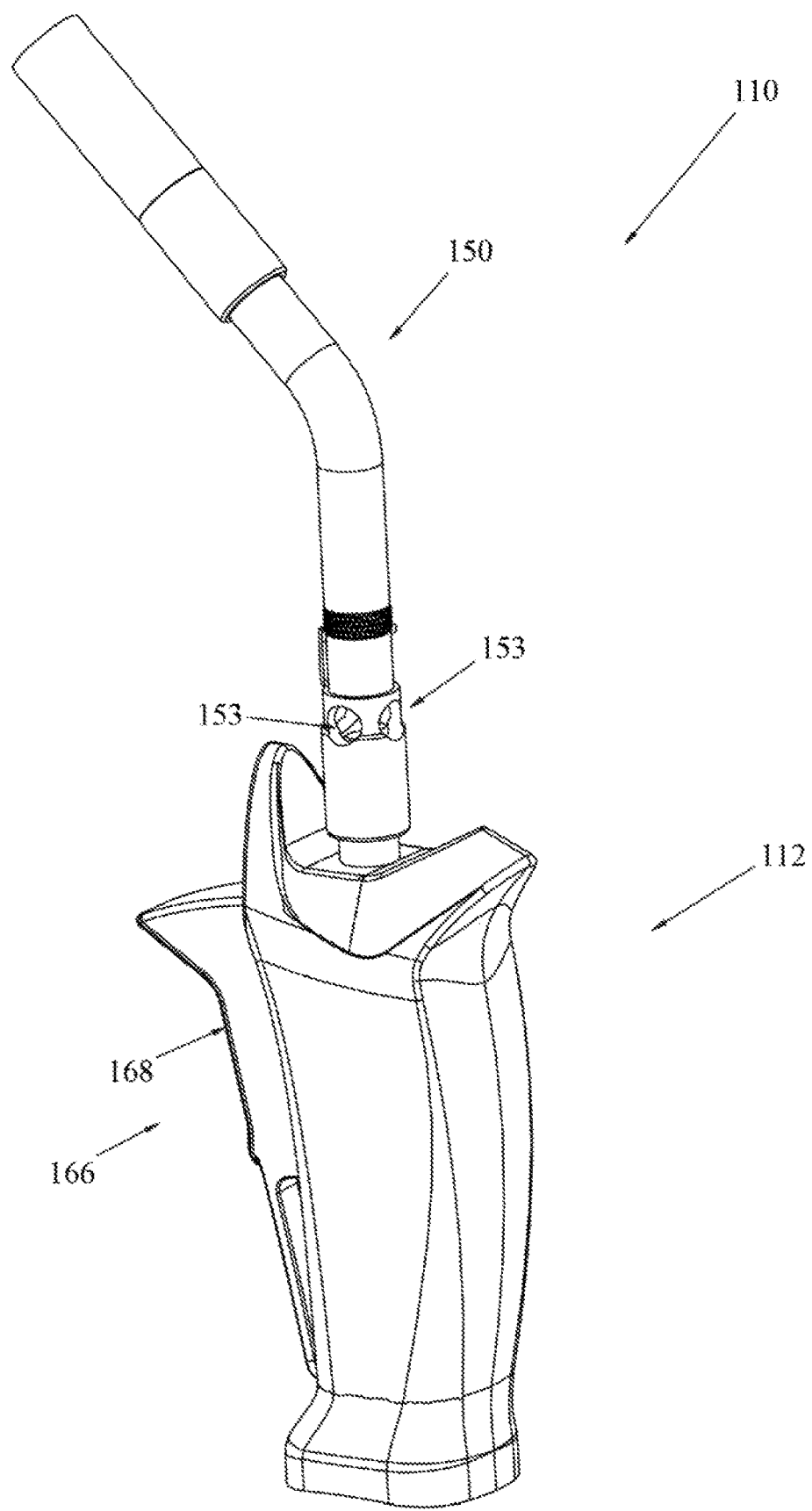
FIG. 10 is a perspective view of a torch according to another embodiment.
Figure 11:
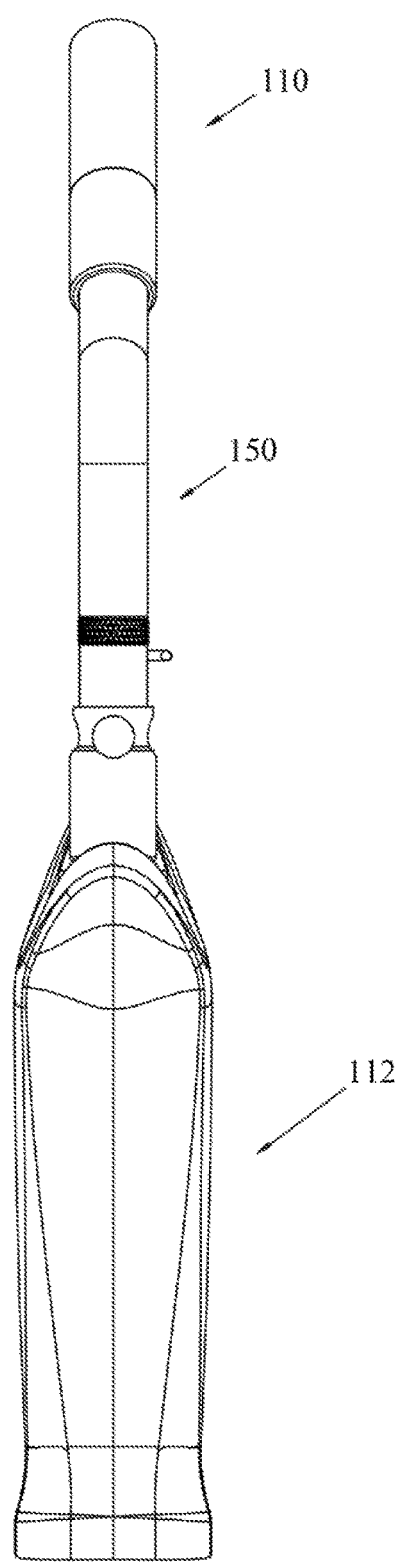
FIG. 11 is a top plan view of the torch of FIG. 10.
Figure 12:
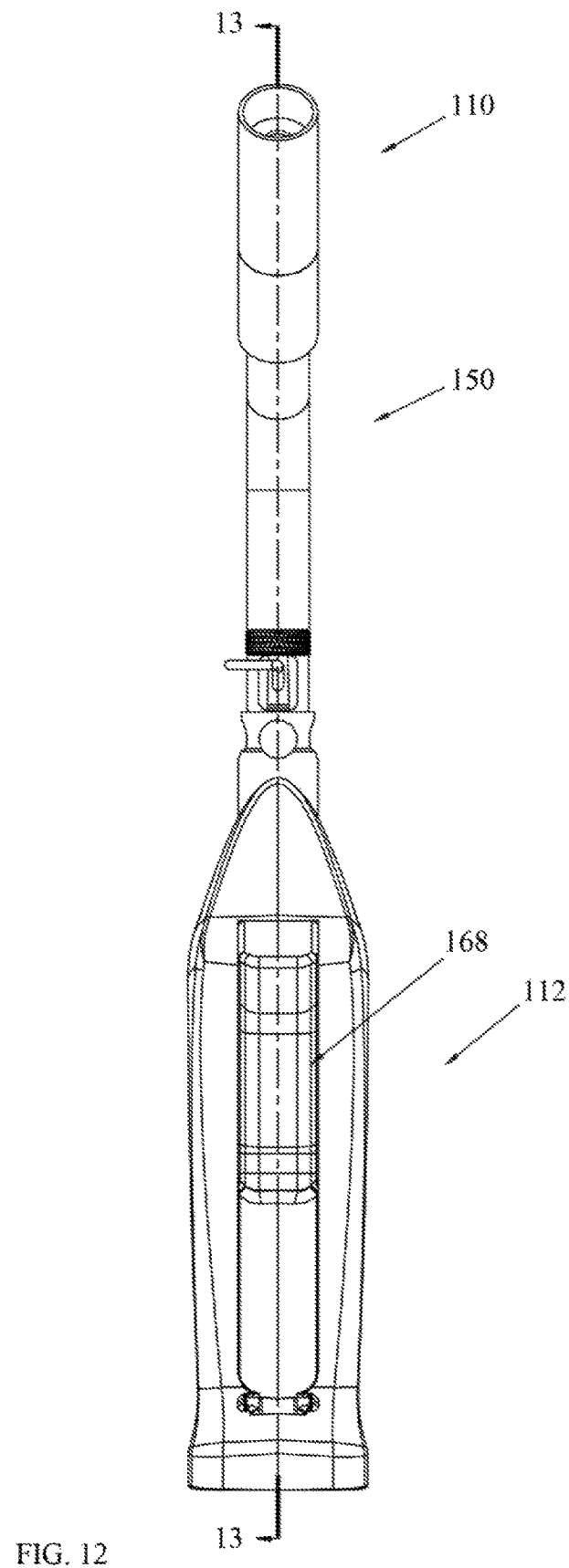
FIG. 12 is a bottom plan view of the torch of FIG. 10.

The regulator 16 can include a regulator housing 30, which can define a regulator chamber 32 and a regulator longitudinal axis 34. The regulator longitudinal axis 34 (FIGS. 4 and 7) can extend transversely to the body longitudinal axis 15 (FIGS. 4 and 7). The regulator 16 can include a regulator valve 36 and a regulator valve actuating device 38 (FIGS. 4 and 7), and each of the regulator valve 36 and the regulator valve actuating device 38 can be disposed within the regulator chamber 32. In one embodiment, the regulator valve actuating device 38 can be axially symmetric. In another embodiment, the regulator valve actuating device 38 can be axially asymmetric. The regulator chamber 32 can include a fuel inlet zone 40 and a fuel outlet zone 42 (FIGS. 5 and 8), which can be in selective fluid communication with one another. The fuel inlet zone 40 can be in selective fluid communication with a source of hydrocarbon fuel, i.e., the fuel inlet zone 40 can be in selective fluid communication with a passage, chamber, cavity or other space capable of containing fuel, which can be defined by a source of hydrocarbon fuel, e.g., a cylindrical, or generally cylindrical, tank or other container which can contain a gaseous hydrocarbon fuel such as propane or propylene. The torch 10 can include a first conduit 44 (FIGS. 4 and 8), which can define a first conduit flow passage 46, which can be in fluid communication with each of the fuel inlet zone 40 and the intake flow passage 24. The first conduit 44 can be attached, for example, brazed, to each of the fuel inlet connector 20 and the regulator housing 30.

The torch 10 can include a burn tube 50, which can be coupled with the body 12, and can define a burn tube flow passage 52, which can be in fluid communication with the fuel outlet zone 42. The burn tube 50 can also define a plurality of apertures 53 (FIGS. 1, 4 and 7), which are in fluid communication with the burn tube flow passage 52. During operation of the torch 10, air can be aspirated into the burn tube flow passage 52 through the apertures 53. The burn tube 50 can be coupled with the body 12 with a coupler 54, which can be attached to the body 12, e.g., with mating threads, and can be releasably attached to the burn tube 50, to facilitate replacing the burn tube 50 if required. The coupler 54 can define a coupler flow passage 56, and can include a valve 58 disposed within the coupler flow passage 56. The valve 58 can be normally closed, which can also facilitate replacing the burn tube 50 if required. The torch 10 can include a second conduit 60 that can extend between the regulator housing 30 and the coupler 54. The second conduit 60 can be attached, e.g., brazed, soldered, glued, or threaded to each one of the regulator housing 30 and the coupler 54. The second conduit 60 can define a second conduit flow passage 62, which can be in fluid communication with each one of the fuel outlet zone 42 and the coupler flow passage 56. The valve 58 can be configured to open when the burn tube 50 is coupled with the coupler 54, which can provide fluid communication between the fuel outlet zone 42 and the burn tube flow passage 52, via the second conduit flow passage 62, coupler flow passage 56 and a flow passage defined by the valve 58.

The torch 10 can include a trigger assembly 66. The trigger assembly 66 can include a trigger 68, which can be pivotally coupled with the body 12, and can be pivotable between an off position, shown in FIGS. 4 and 5, and a full flow position, shown in FIGS. 7 and 8. The trigger 68 can be pivotally coupled with the body 12 via a pin 70, or other suitable pivot structure. In other embodiments, the trigger 68 and the body 12 can be configured so that the trigger 68 can translate, rather than pivot, relative to the body 12, between an off position and a full flow position. The trigger assembly 66 can also include a regulator spring 72 and an igniter spring 74, which can be disposed within the interior cavity 14. Each of the regulator spring 72 and the igniter spring 74 can be a coil spring and each can be connected to the trigger 68, as shown in FIGS. 4-5 and 7-8. In one embodiment, the trigger 68 can include protrusions 76 and 78, which can extend inwardly into the interior cavity 14. The regulator spring 72 can be connected to the protrusion 76 and the igniter spring 74 can be connected to the protrusion 78.

The regulator valve 36 can include a valve housing 80 (FIGS. 5 and 8) disposed within the regulator chamber 32. Regulator valve 36 can be closed when the trigger 68 is in the off position, and can be open as the trigger 68 pivots toward the full flow position. The valve housing 80 can be disposed in sealing engagement with the regulator housing 30, and can define a valve flow passage 82. The regulator valve 36 can include a valve plunger 84, which can extend through the valve flow passage 82. The valve plunger 84 can be movable relative to the valve housing 80, between a closed position shown in FIGS. 4 and 5, and an open position shown in FIGS. 7 and 8. It will be appreciated that the open and closed positions of the valve plunger 84 correspond to open and closed positions, respectively, of the regulator valve 36. When the valve plunger 84 is in the closed position (FIG. 5), a proximal end 85 of the valve plunger 84 contacts the valve housing 80, and closes one end of the valve flow passage 82. In one embodiment, the valve housing 80 can include an annular valve seat 81, and the proximal end 85 of the valve plunger 84 can include an annular shoulder 83, which can be disposed in sealing engagement with the annular valve seat 81 when the regulator valve 36 is closed. In other embodiments, the proximal end 85 of the valve plunger 84 and the mating, or proximal, end of the valve housing 80 can have different configurations, which can also close one end of the valve flow passage 82 when the regulator valve 36 is closed. The regulator valve 36 can be normally closed, i.e., the regulator valve 36 can be biased toward a closed position, for example, by a resilient member (not shown) that can bias the annular shoulder 83 toward the annular valve seat 81. The closed position of the valve plunger 84, in combination with the sealing engagement of the valve housing 80 with the regulator housing 30, can prevent, or at least substantially prevent, fluid communication between the fuel inlet zone 40 and the fuel outlet zone 42, such that the fuel inlet zone 40 and the fuel outlet zone 42 are fluidicly uncoupled. When the valve plunger 84 is in the open position (FIG. 8), the proximal end 85 of the valve plunger 84 can be spaced from the valve housing 80, and the fuel inlet zone 40 can be in fluid communication with the fuel outlet zone 42, via the valve flow passage 82.

The regulator valve actuating device 38 can be axially, or longitudinally, slideable within the regulator chamber 32 and can be disposed in a confronting relationship with the valve plunger 84. When the trigger 68 is in the off position, the regulator valve actuating device 38 can contact the valve plunger 84 with insufficient force to urge the proximal end 85 of the valve plunger 84 away from the valve housing 80, or can be positioned in close proximity to, but spaced from, the valve plunger 84, such that the regulator valve 36 is closed. The trigger 68 can contact, and compress, the regulator spring 72 as the trigger 68 pivots between the off position and the full flow position. As a result, the regulator spring 72 can urge the regulator valve actuating device 38 against the valve plunger 84, causing the proximal end 85 of the valve plunger 84 to be spaced from the valve housing 80, such that the regulator valve 36 is open and the fuel inlet zone 40 is in fluid communication with the fuel outlet zone 42, via the valve flow passage 82.

The torch 10 can include an actuator spring 86 (FIGS. 5 and 8), which can be disposed within the fuel outlet zone 42 of the regulator chamber 32. The actuator spring 86 can extend between a seat 98, or shoulder, (FIG. 5 and FIG. 8) of the regulator housing 30 and the regulator valve actuating device 38, and can bias the regulator valve actuating device 38 away from the valve plunger 84, to facilitate maintaining the regulator valve 36 in a closed position when the trigger 68 is in the off position, to avoid undesirable leakage of hydrocarbon fuel into the burn tube flow passage 52 when the trigger 68 is in the off position. The actuator spring 86 can be a coil spring, as shown in FIGS. 4-5 and 7-8.

The regulator valve actuating device 38 can include a piston 87 (FIGS. 5 and 8), which can have a plurality of annular grooves or channels, which extend inwardly. In the embodiment of FIGS. 1-9, the piston 87 includes two annular grooves 88. The regulator valve actuating device 38 can also include a first O-ring 89, which can be disposed in one of the grooves 88, and can include a second O-ring 90, which can be disposed in the other one of the grooves 88. In other embodiments, additional grooves can be formed in the piston 87, and the regulator valve actuating device 38 can include additional O-rings disposed in the additional grooves. Each of the O-rings 89 and 90 can surround the piston 87, and can be disposed in sealing engagement with an inner surface 17 of the regulator housing 30. The piston 87 can include a first end flange 91, a first protrusion 92 extending axially away from the first end flange 91 (FIG. 8), a second end flange 93, and a second protrusion 94 extending axially away from the second end flange 93. The first protrusion 92 can be disposed in a confronting relationship with the valve plunger 84 of the regulator valve 36. A periphery of each of the first end flange 91 and the second end flange 93 can be disposed in close proximity to the inner surface 17, but radially spaced from the inner surface 17. During operation of torch 10, hydrocarbon fuel within the fuel outlet zone 42 can leak around the first end flange 91, between the periphery of the first end flange 91 (FIG. 8) and the inner surface 17 of the regulator housing 30, such that the first O-ring 89 can be exposed to hydrocarbon fuel for extended periods of time. The first O-ring 89 can be made of a hydrocarbon-resistant material, which can avoid, or at least minimize, degradation of the first O-ring 89 due to exposure to hydrocarbon fuel for extended periods of time. For example, a synthetic rubber and fluoropolymer elastomer can be used for the manufacture of O-ring 89. Although the hydrocarbon-resistant material of O-ring 89 can at least minimize degradation due to exposure to hydrocarbon fuel for extended periods of time, it may not have desirable ductility over a wide range of operating temperatures, including relatively cold temperatures, for example, minus 40° F. and lower.

The sealing engagement of the first O-ring 89 with the inner surface 17 of the regulator housing 30 can prevent, or at least substantially prevent, the second O-ring 90 from being exposed to hydrocarbon fuel during operation of the torch 10. Accordingly, the second O-ring 90 can be made of a different material, for example, a material that may not minimize degradation of O-ring 90 due to extended exposure to hydrocarbon fuel, but that can remain ductile over a wide range of operating temperatures, including operation at relatively cold temperatures, for example, minus 40° F. and lower. In one embodiment, the second O-ring 90 can be made of a synthetic rubber copolymer of acrylonitrile and butadiene. In other embodiments, the O-ring 89 and the O-ring 90 can be made of the same material, for example, a hydrocarbon-resistant material that can remain ductile over a wide range of operating temperatures, including relatively cold temperatures, for example, minus 40° F. and lower. The combination of the first O-ring 89, which is resistant to degradation due to extended exposure to hydrocarbon fuel, and the second O-ring 90, which can remain ductile, and therefore can remain in sealing engagement with the inner surface 17 of the regulator housing 30, throughout a wide range of ambient temperatures, can prevent undesirable leakage of hydrocarbon fuel past the O-rings 89 and 90 to the exterior environment in which torch 10 is used, throughout a wide range of operating temperatures, including relatively cold temperatures, for example, minus 40° F. and lower.

The combination of O-rings 89 and 90 can also enhance the stability of the regulator valve actuating device 38 as it moves axially, or longitudinally within the regulator chamber 32, which can enhance the stability of the flame discharging from the burn tube 50 of torch 10. For example, the combination of O-rings 89 and 90 can prevent the regulator valve actuating device 38 from being "cocked", or axially misaligned, within the regulator chamber 32, which could prevent, or at least inhibit, axial movement of the regulator valve actuating device 38 within the regulator chamber 32. Such misalignment could result in inconsistent regulation of the pressure of the hydrocarbon fuel downstream of the pressure regulator 16, which could cause inconsistency of hydrocarbon fuel flow, which in turn could cause instability in the height and intensity of the flame discharging from the burn tube 50 of torch 10.

When a source of hydrocarbon fuel, e.g., a cylindrical tank containing gaseous hydrocarbon fuel such as propane or propylene, is connected to the fuel inlet connector 20, the intake stem 22 can open a valve within the source of hydrocarbon fuel, which can permit the fuel to flow into the intake flow passage 24 and through the first conduit flow passage 46 to the fuel inlet zone 40. The regulator valve 36 can be closed when the trigger 68 is in the off position, and the valve housing 80 of the regulator valve 36 can be disposed in sealing engagement with the inner surface 17 of the regulator housing 30. As a result, the fuel inlet zone 40 and the fuel outlet zone 42 can be fluidicly uncoupled, and the pressure of the hydrocarbon fuel within the fuel inlet zone 40 can facilitate maintaining the regulator valve 36 in a closed position, when the trigger 68 is in the off position.

A user of torch 10 can initiate the flow of hydrocarbon fuel to the fuel outlet zone 42, and to the burn tube flow passage 52, by depressing the trigger 68 and pivoting the trigger 68 away from the off position toward the full flow position. Additionally, the user can vary the flow rate of hydrocarbon fuel to the burn tube flow passage 52, and therefore the size of the flame of torch 10, throughout the range of positions of the trigger 68, by varying the position of the trigger 68. Pivotal movement of the trigger 68 toward the full flow position can open the regulator valve 36, by a continuously increasing amount, which can permit the fuel to flow from the fuel inlet zone 40, through the valve flow passage 82 to the fuel outlet zone 42. The fuel can then flow through the second conduit flow passage 62, the coupler flow passage 56, and a flow passage defined by the valve 58 to the burn tube flow passage 52. The size of the flame of torch 10 can increase as the trigger 68 pivots toward the full flow position. Similarly, the flow rate of the hydrocarbon fuel to the burn tube flow passage 52, and the size of the flame of torch 10, can be reduced by releasing the trigger 68, or applying less force to the trigger 68, so that the trigger 68 pivots toward the off position. The regulator spring 72 and the igniter spring 74 can combine to urge the trigger 68 toward the off position.

The fuel pressure within the fuel inlet zone 40 can vary with parameters that can include the fuel pressure within the source of hydrocarbon fuel. Use of some conventional sources of hydrocarbon fuel can result in the fuel pressure within the fuel inlet zone 40 being about 110 psig at room temperature. The extent of the opening of the regulator valve 36 and the instantaneous fuel pressure within the fuel outlet zone 42 can depend upon several factors, which can include the fuel pressure within the fuel inlet zone 40, the characteristics of a resilient member within the regulator valve 36, the position of the trigger 68, the spring constant of the regulator spring 72, the spring constant of the actuator spring 86, the frictional engagement of the O-rings 89 and 90 with the regulator housing 30, and the "back pressure" created by a flow restriction in the coupler 54, for example, a flow restriction within the valve 58. The regulator spring 72 can have a linear spring constant, or can have a nonlinear spring constant, to provide a desired "feel", or feedback, to a user of torch 10, and to effect the desired fuel pressure in the fuel outlet zone 42, while pivoting the trigger 68 between the off and full flow positions.

As the regulator valve 36 opens, the fuel pressure within the fuel outlet zone 42 can increase until the force exerted on the regulator valve actuating device 38 momentarily equals the force exerted on the regulator valve actuating device 38 by the regulator spring 72. This can result in a corresponding fuel pressure and flow rate to the burn tube flow passage 52, and a corresponding size of the flame of torch 10. The pressure within the fuel outlet zone 42 can then increase until the force exerted on the regulator valve actuating device 38 as a result of this pressure exceeds the force exerted on the regulator valve actuating device 38 by the regulator spring 72. This can permit the regulator valve 36 to close, stopping the flow of hydrocarbon fuel for an instant, which can have a negligible, indiscernible effect on the size of the flame of torch 10. As the hydrocarbon fuel flows through the burn tube flow passage 52, the fuel pressure within the fuel outlet zone 42 can decrease to an extent that the regulator valve 36 opens again, and the flow of fuel resumes. This cyclical process occurs in a very brief period of time, and can result in a continuous, or substantially continuous, increase in the size of the flame of torch 10 as the trigger 68 is pivoted toward the full flow position. A similar cyclical process can occur when the trigger 68 is pivoted toward the off position, resulting in a decrease in the size of the flame of torch 10.

The pivotal movement of the trigger 68 can also compress the igniter spring 74 of the trigger assembly 66, which can actuate the igniter 18. The torch 10 can include a wire 19 (FIGS. 4 and 7), which can be disposed, at least partially, within the burn tube flow passage 52, and can be electrically coupled with the igniter 18. Actuation of the igniter 18 can cause an electric arc between the wire 19 and the burn tube 50, causing hydrocarbon fuel within the burn tube flow passage 52 to ignite. The regulator spring 72 and the igniter spring 74 can be sized so that the fuel is ignited with the initiation of fuel flow through the burn tube flow passage 52.

The torch 10 can be configured to avoid, or at least minimize, any leakage of fuel to the environment in which the torch 10 is being used. For example, in addition to the materials of the first O-ring 89 and the second O-ring 90, and the sealing engagement of the first O-ring 89 and the second O-ring 90 with the inner surface 17 of the regulator housing 30, the regulator spring 72 can be sized so that it is spaced, by a gap, which can be relatively small, from the regulator valve actuating device 38, or to contact the regulator spring 72, but with insufficient force to move the regulator valve actuating device 38, when the trigger 68 is in the off position. This can facilitate maintaining the regulator valve 36 in the closed position by preventing the regulator valve actuating device 38 from urging the proximal end 85 of the valve plunger 84 away from the valve housing 80. Additionally, the actuator spring 86 can be sized so that it urges the regulator valve actuating device 38 away from the valve plunger 84 of the regulator valve 36 to create a gap, which can be a relatively small gap, between the regulator valve actuating device 38 and the valve plunger 84, when the trigger 68 is in the off position, to further facilitate maintaining the regulator valve 36 in a closed position. In another embodiment, the regulator valve actuating device 38 can contact the valve plunger 84 when the trigger is in the off position, but with insufficient force to open the regulator valve 36.

Figure 13:
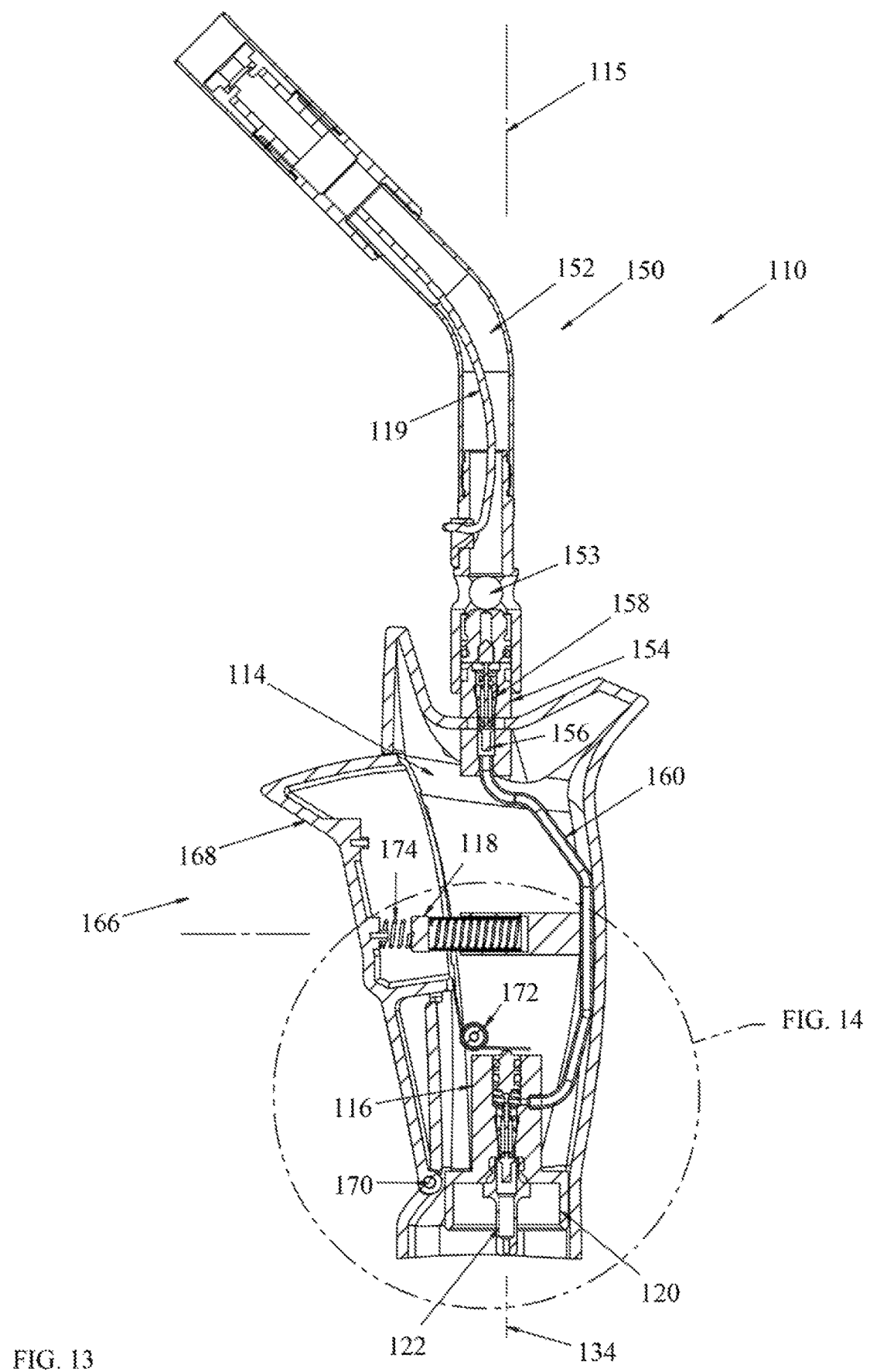
FIG. 13 is a cross-sectional view taken along line 13-13 in FIG. 12, with a trigger of the torch of FIG. 10 depicted in an off position.
Figure 14:
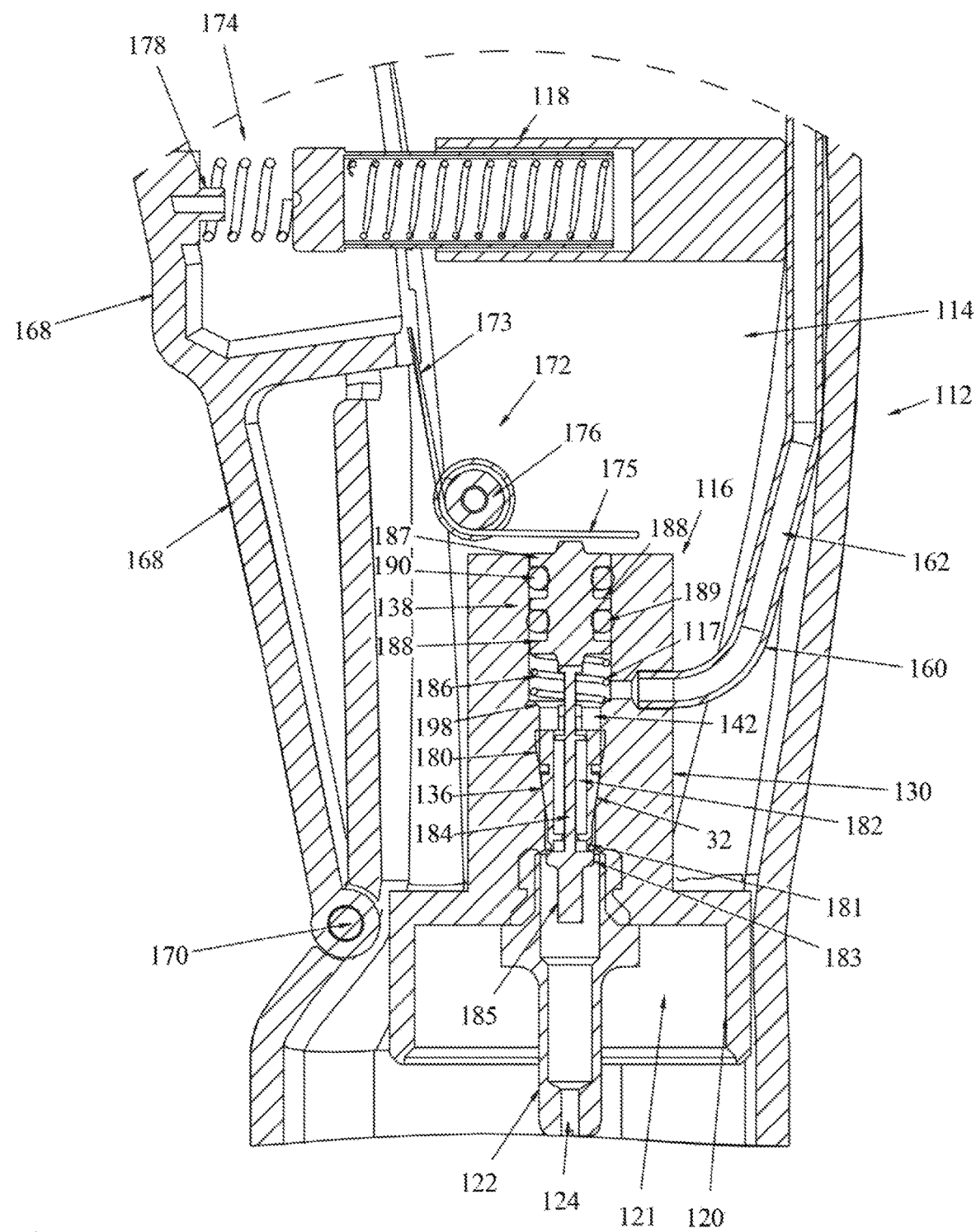
FIG. 14 is an enlarged view of an encircled portion of FIG. 13.
Figure 15:
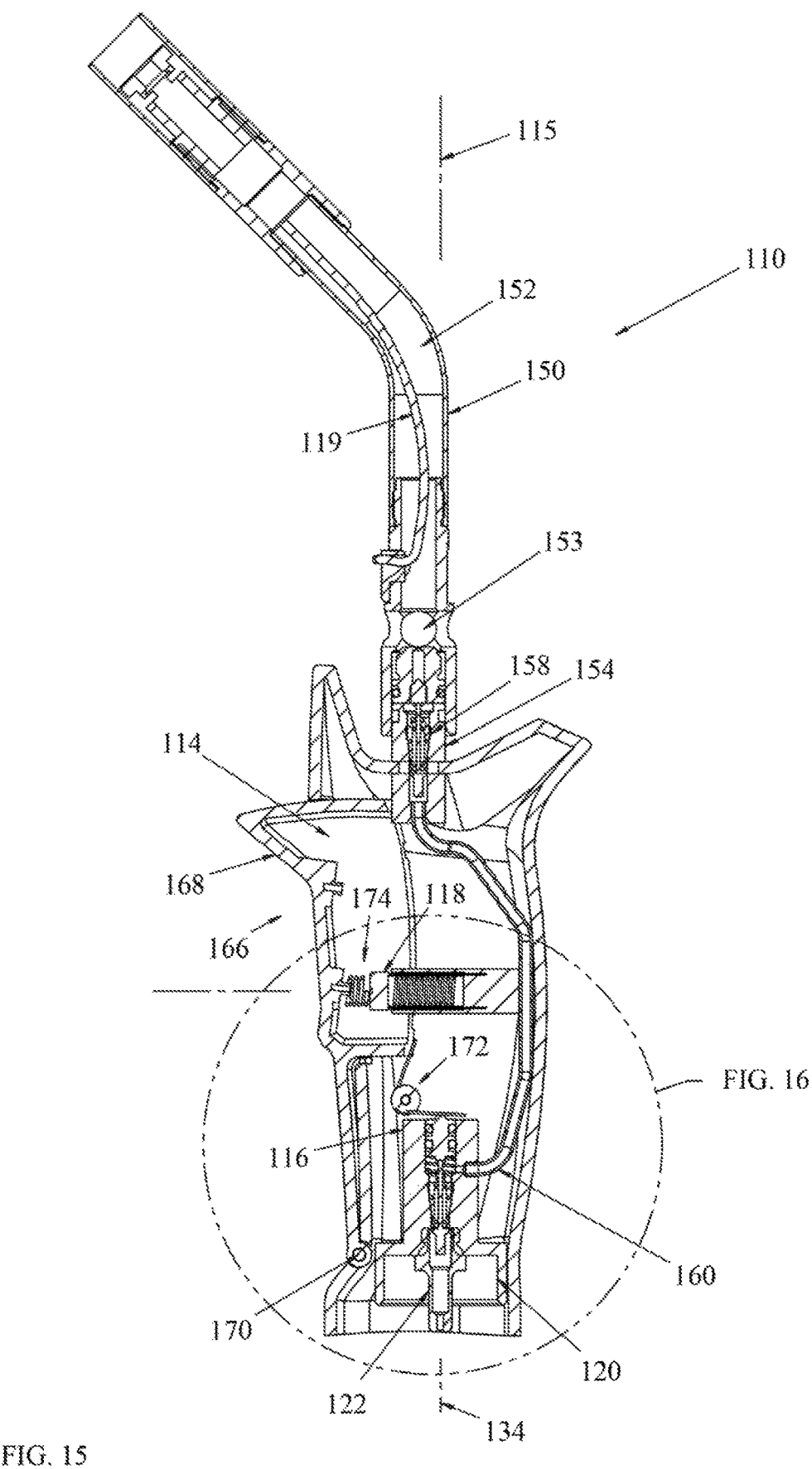
FIG. 15 is a cross-sectional view similar to FIG. 13, but with the trigger depicted in a full flow position.
Figure 16:
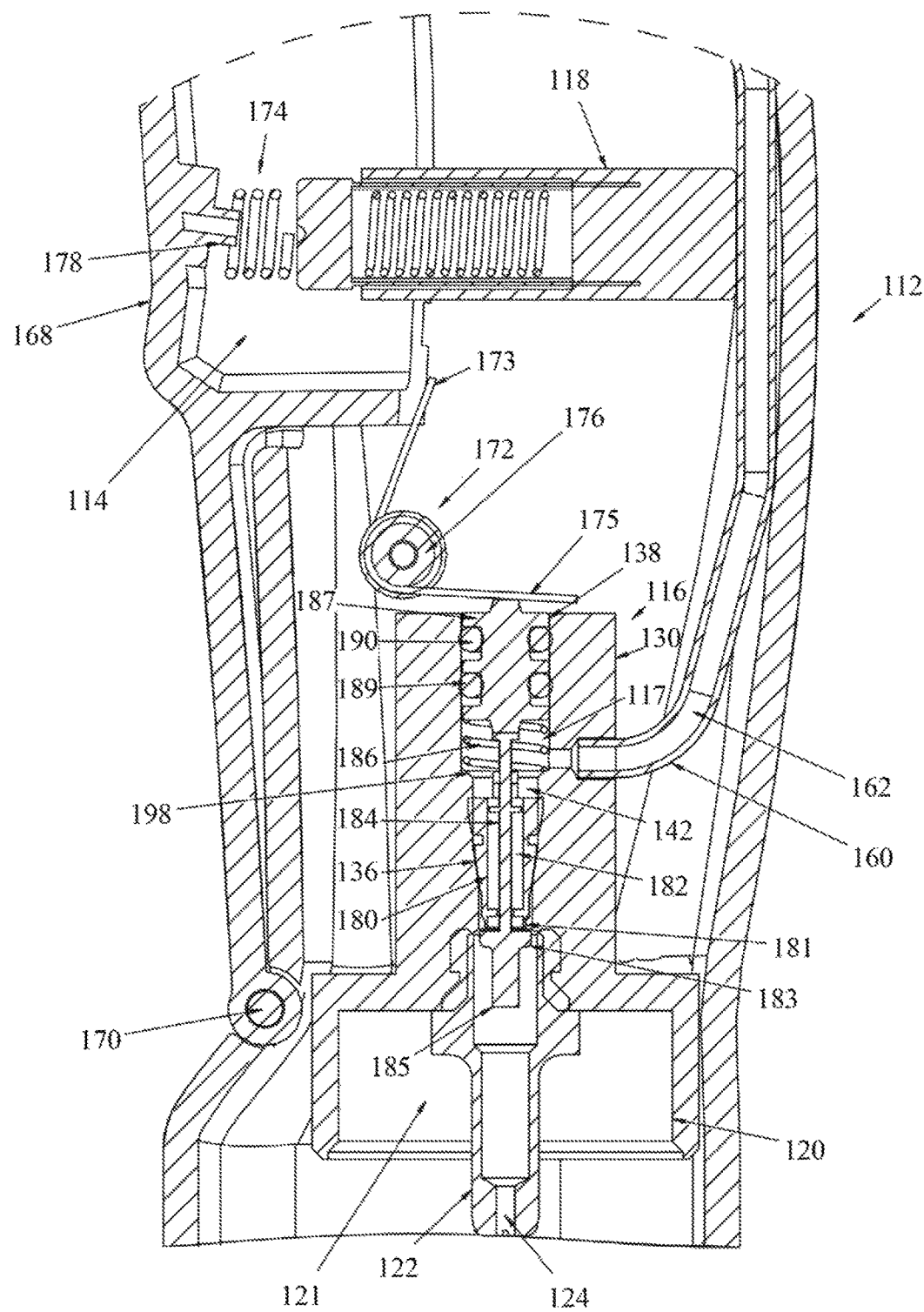
FIG. 16 is an enlarged view of an encircled portion of FIG. 15.
Figure 17:
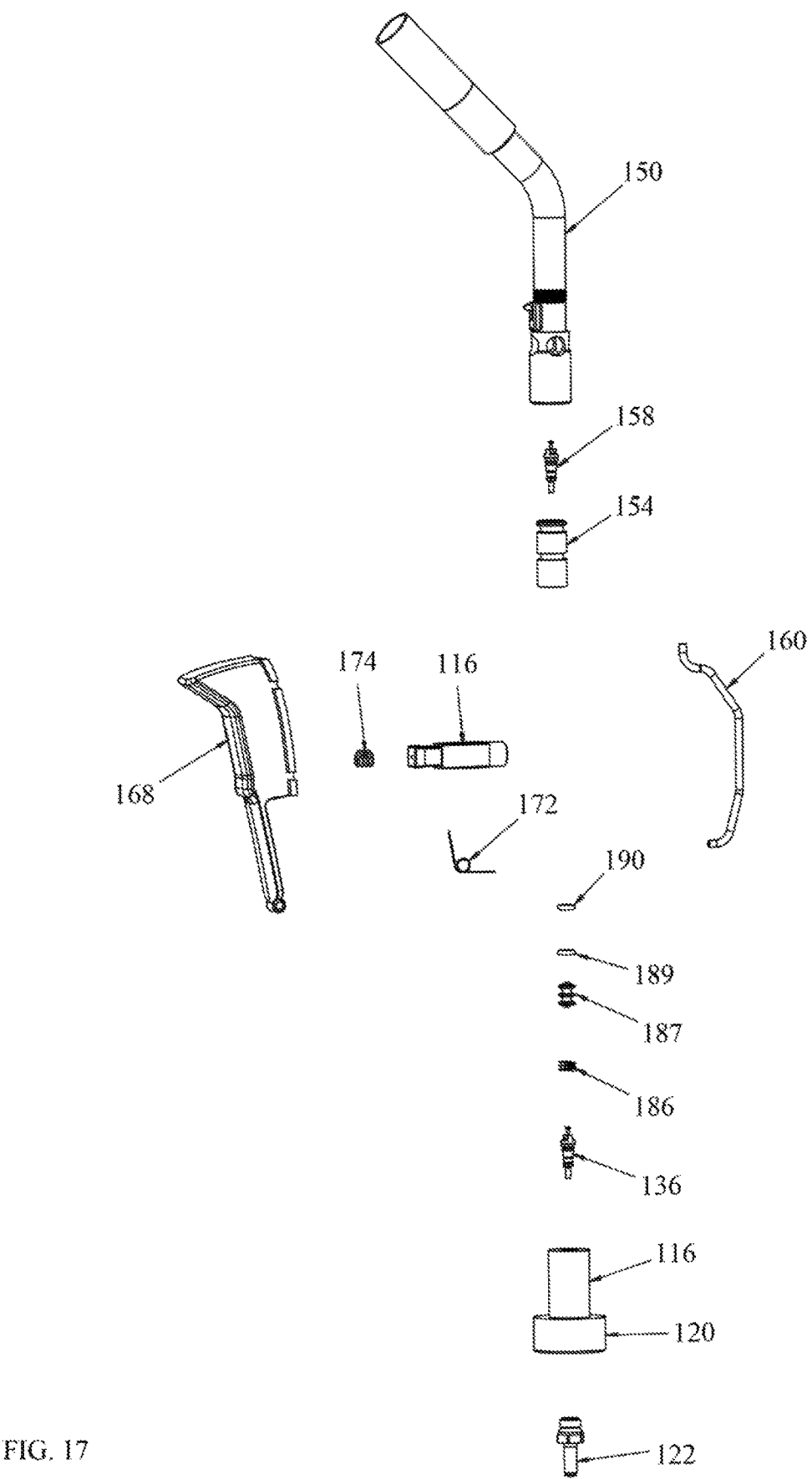
FIG. 17 is an exploded perspective view of the torch of FIG. 10, with a body of the torch omitted.
Figure 18:
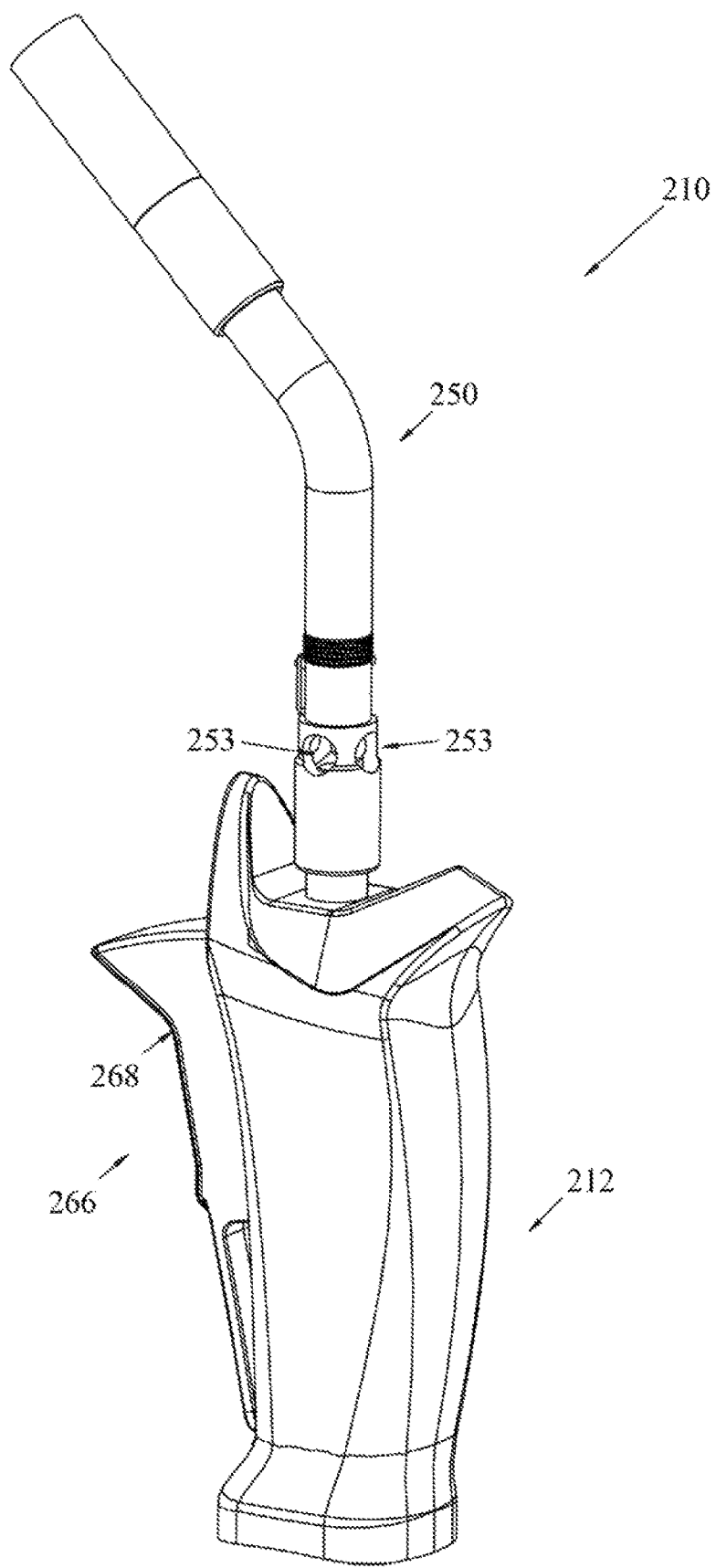
FIG. 18 is a perspective view of a torch according to another embodiment.
Figure 21:
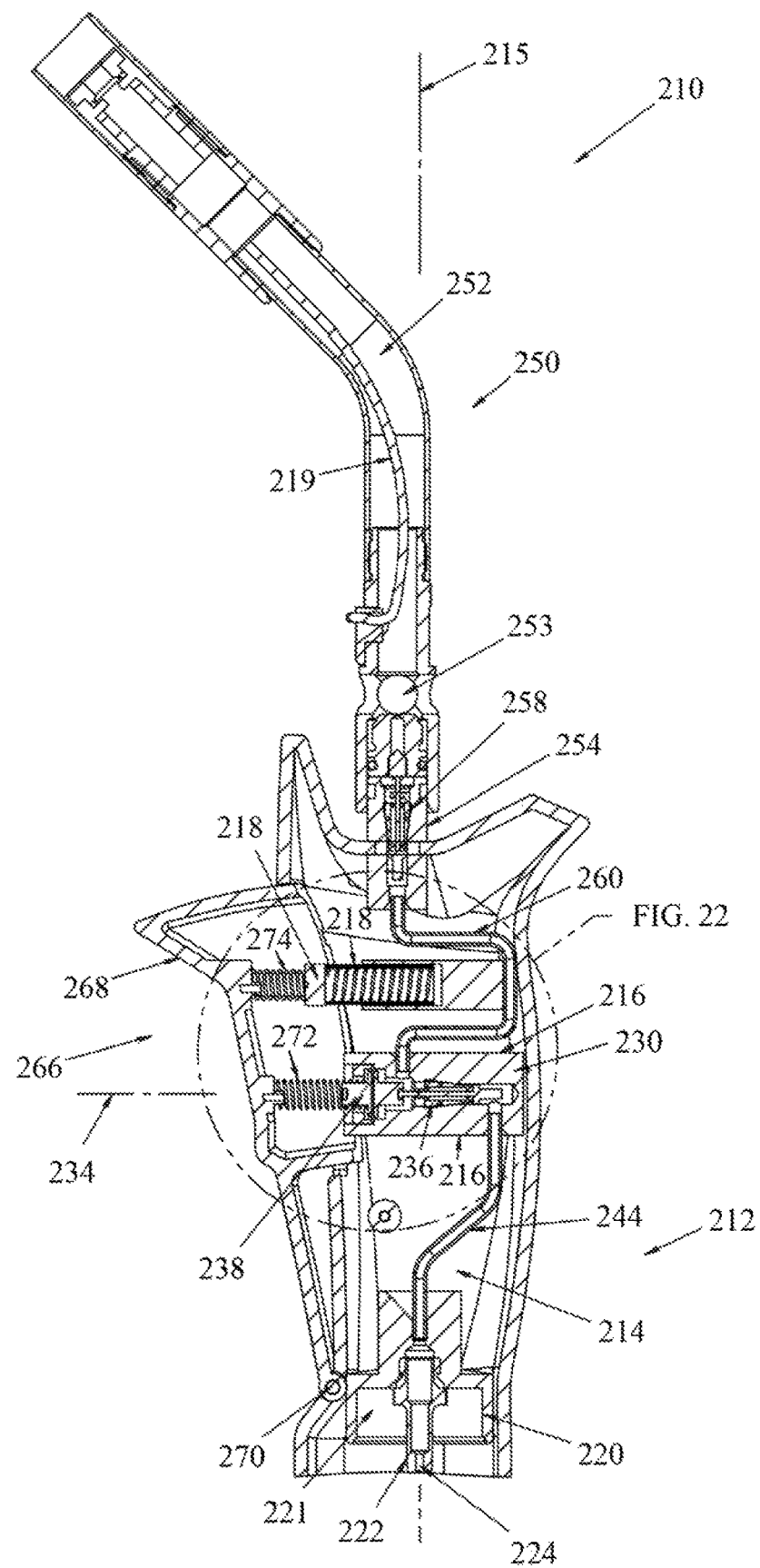
FIG. 21 is a cross-sectional view taken along line 21-21 in FIG. 20, with a trigger of the torch of FIG. 18 depicted in an off position.

FIGS. 10-17 illustrate a torch 110 according to another embodiment. The torch 110 can include a body 112 that can define an interior cavity 114 and can define a longitudinal body axis 115 (FIGS. 13 and 15). Torch 110 can also include a regulator 116, an igniter 118, and a fuel inlet connector 120, and each can be positioned within the interior cavity 114 as shown in FIGS. 13 and 15. The regulator 116 can include a regulator housing 130 (FIGS. 14 and 16). The regulator housing 130 and the fuel inlet connector 120 can be made as a unitary construction. The fuel inlet connector 120 can define a connector cavity 121. An intake stem 122 can be secured to the regulator housing 130 and can extend through the connector cavity 121. The intake stem 122 can define an intake flow passage 124, and can be configured so that it opens a valve, which can have an industry-standard configuration, within a source of hydrocarbon fuel when the fuel inlet connector 120 is coupled with the source of hydrocarbon fuel. This can provide fluid communication between the intake flow passage 124 and a chamber or cavity defined by the source of hydrocarbon fuel, which can contain a gaseous hydrocarbon fuel such as propane or propylene.

The regulator housing 130 can define a regulator chamber 132 (FIG. 14) and a regulator longitudinal axis 134 (FIG. 15). In the embodiment shown in FIGS. 10-17, the regulator longitudinal axis 134 can be parallel, or generally parallel, with the body longitudinal axis 115. The regulator 116 can include a regulator valve 136 and a regulator valve actuating device 138 (FIGS. 14 and 16). Each of the regulator valve 136, which can be normally closed, and the regulator valve actuating device 138 can be at least partially disposed within the regulator chamber 132. In one embodiment, the regulator valve actuating device 138 can be axially symmetric. In another embodiment, the regulator valve actuating device 138 can be axially asymmetric. The regulator chamber 132 can include a fuel outlet zone 142, which can be in selective fluid communication with the intake flow passage 124.

The torch 110 can include a burn tube 150, which can be coupled with the body 112, and can define a burn tube flow passage 152. The burn tube 150 can also define a plurality of apertures 153 (FIGS. 10, 13 and 15), which are in fluid communication with the burn tube flow passage 152. During operation of the torch 110, air can be aspirated into the burn tube flow passage 152 through the apertures 153. The burn tube 150 can be coupled with the body 112 with a coupler 154, which can be attached to the body 112, e.g., with mating threads, and can be releasably attached to the burn tube 150, to facilitate replacing the burn tube 150 if required. The coupler 154 can define a coupler flow passage 156, and can include a valve 158 disposed within the coupler flow passage 156. The valve 158 can be configured the same as, or similar to, the valve 58 of torch 10, and can function the same as, or similar to, the valve 58.

Due to the unitary construction and orientation of the regulator 116 and the fuel inlet connector 120, the torch 110 can include a single conduit, e.g., conduit 160, in lieu of the first conduit 44 and the second conduit 60 of torch 10. As a result, torch 110 can have two less attachment joints, e.g., two less braze joints, relative to torch 10, which can simplify assembly and reduce costs. For example, the attachment joints of torch 10 associated with the first conduit 44 of torch 10 can be eliminated in torch 110. The conduit 160 can define a conduit flow passage 162, which can be in fluid communication with each of the fuel outlet zone 142 and the coupler flow passage 156 to provide fluid communication between the burn tube flow passage 152 and the fuel outlet zone 142.

Torch 110 can include a trigger assembly 166. The trigger assembly 166 can include a trigger 168, which can be pivotally coupled with the body 112, and can be pivotable between an off position, shown in FIGS. 13 and 14, and a full flow position, shown in FIGS. 15 and 16. The trigger 168 can be pivotably coupled with the body 112 via a pin 170, or other suitable pivot structure. In other embodiments, the trigger 168 and the body 112 can be configured so that the trigger 168 can translate, rather than pivot, relative to the body 112, between an off position and a full flow position. The trigger assembly 166 can also include a regulator spring 172 and an igniter spring 174. As shown in FIGS. 14 and 16, body 112 can include a protrusion 176 and the trigger 168 can include a protrusion 178. Each of the protrusions 176 and 178 can extend into the interior cavity 114. The regulator spring 172 can be connected to the body 112 with the protrusion 176, and the igniter spring 174 can be connected to the trigger 168 with the protrusion 178. As shown in FIGS. 13-16, the regulator spring 172 can be a torsion spring, and the igniter spring 174 can be a coil spring.

The regulator spring 172 can be configured to accommodate the pivotal movement of the trigger 168, the position of the regulator housing 130 and a linear movement of the regulator valve actuating device 138 within the regulator chamber 132 defined by the regulator housing 130. A first end 173 of the regulator spring 172 can be in contacting engagement with the trigger 168, and can slide along the trigger 168, as the trigger 168 pivots from the off position toward the full flow position. In one embodiment, a second end 175 of the regulator spring 172 can be positioned adjacent to, but spaced from, the regulator valve actuating device 138 when the trigger 168 is in the off position. In another embodiment, the second end 175 of the regulator spring 172 can contact the regulator valve actuating device 138, but the force exerted on the regulator valve actuating device 138 can be insufficient to move the regulator valve actuating device 138. The second end 175 of the regulator spring 172 can be in contacting engagement with the regulator valve actuating device 138, as the trigger 168 pivots from the off position toward the full flow position.

The regulator valve 136 can include a valve housing 180 (FIGS. 14 and 16) disposed within the regulator chamber 132. The regulator valve 136 can be closed when the trigger 168 is the off position, and can open as the trigger 168 pivots toward the full flow position. The valve housing 180 can be disposed in sealing engagement with an inner surface 117 of the regulator housing 130, and can define a valve flow passage 182. The regulator valve 136 can include a valve plunger 184, which can extend through the valve flow passage 182. The valve plunger 184 can be movable relative to the valve housing 180, between a closed position shown in FIGS. 13 and 14, and an open position shown in FIGS. 15 and 16. It will be appreciated that the open and closed positions of the valve plunger 184 correspond to open and closed positions, respectively, of the regulator valve 136. When the valve plunger 184 is in the closed position, an annular shoulder 183 of a proximal end 185 of the valve plunger 184 can be disposed in sealing engagement with an annular seat 181 of the valve housing 180, and close one end of the valve flow passage 182. The closed position of the valve plunger 184, in combination with the sealing engagement of the valve housing 180 with inner surface 117 of the regulator housing 130, can prevent, or at least substantially prevent, fluid communication between the intake flow passage 124 and the fuel outlet zone 142, such that the intake flow passage 124 and the fuel outlet zone 142 are fluidicly uncoupled. When the valve plunger 184 is in the open position, the proximal end 185 of the valve plunger 184 can be spaced from the valve housing 180, and the intake flow passage 124 can be in fluid communication with the fuel outlet zone 142, via the valve flow passage 182. The regulator valve 136 can be configured such that it is biased toward the closed position, i.e., the proximal end 185 of the plunger 184 can be biased toward the valve housing 180.

The regulator valve actuating device 138 can be slideable within the regulator chamber 132 and can be disposed in a confronting relationship with the valve plunger 184. The regulator valve actuating device 138 can contact the valve plunger 184, or can be positioned in close proximity to, but spaced from, the valve plunger 184 when the trigger 168 is in the off position. The first end 173 of the regulator spring 172 can contact, and slide along, the trigger 168 as the trigger 168 pivots between the off position and the full flow position. The second end 175 of the regulator spring 172 can contact the regulator valve actuating device 138 and can urge the regulator valve actuating device 138 against the valve plunger 184, as the trigger 168 pivots between the off position and the full flow position. This can cause the proximal end 185 of the valve plunger 184 to be spaced from the valve housing 180, such that the regulator valve 136 is open and the intake flow passage 124 is in fluid communication with the fuel outlet zone 142, via the valve flow passage 182.

The torch 110 can include an actuator spring 186, which can be disposed within the fuel outlet zone 142 of the regulator chamber 132. The actuator spring 186 can extend between a seat 198, or shoulder, (FIG. 14) of the regulator housing 130 and the regulator valve actuating device 138, and can bias the regulator valve actuating device 138 away from the valve plunger 184, to facilitate maintaining the regulator valve 136 in a closed position, when the trigger 168 is in the off position, to avoid undesirable leakage of hydrocarbon fuel into the burn tube flow passage 152 when the trigger 168 is in the off position.

The regulator valve actuating device 138 can include a piston 187 (FIGS. 14 and 16), which can slide axially within the regulator chamber 132 and can include a plurality of annular grooves or channels. In the embodiment of FIGS. 10-17, the piston 187 has two annular grooves 188 (FIG. 14). The regulator valve actuating device 138 can also include a first O-ring 189, which can be disposed in one of the grooves 188, and can include a second O-ring 190, which can be disposed in the other one of the grooves 188. In other embodiments, the piston 187 can have additional annular grooves, and the regulator valve actuating device 138 can include additional O-rings disposed in the additional grooves. Each of the O-rings 189 and 190 can surround the piston 187, and can be disposed in sealing engagement with the inner surface 117 of the regulator housing 130. The first O-ring 189 can be exposed to hydrocarbon fuel when hydrocarbon fuel is present within the fuel outlet zone 142. Similar to the first O-ring 89, the first O-ring 189 can be made of a hydrocarbon-resistant material, which can avoid, or at least minimize, degradation of the first O-ring 189 due to exposure to hydrocarbon fuel for extended periods of time. For example, a synthetic rubber and fluoropolymer elastomer can be used to manufacture O-ring 189. Although the hydrocarbon-resistant material of O-ring 189 can at least minimize degradation due to exposure to hydrocarbon fuel for extended periods of time, it may not have the desired ductility over a wide range of operating temperatures, including relatively cold temperatures, for example, minus 40° F. and lower.

The sealing engagement of the first O-ring 189 with the inner surface 117 of the regulator housing 130 can prevent, or at least substantially prevent, the second O-ring 190 from being exposed to hydrocarbon fuel during operation of the torch 110. Accordingly, the second O-ring 190 can be made of a different material, for example, a material that may not minimize degradation of O-ring 190 due to extended exposure to hydrocarbon fuel, but that can remain ductile over a wide range of operating temperatures, including operation at relatively cold temperatures, for example, minus 40° F. and lower. In one embodiment, the second O-ring 190 can be made of a synthetic rubber copolymer of acrylonitrile and butadiene. In other embodiments, the O-ring 189 and the O-ring 190 can be made of the same material, for example, a hydrocarbon-resistant material that can remain ductile over a wide range of operating temperatures, including relatively cold temperatures, for example, minus 40° F. and lower. The combination of the first O-ring 189, which is resistant to degradation due to extended exposure to hydrocarbon fuel, and the second O-ring 190, which can remain ductile, and therefore can remain in sealing engagement with the inner surface of the regulator housing 130, throughout a wide range of operating temperatures, can prevent undesirable leakage of hydrocarbon fuel past the O-rings 189 and 190 to the exterior environment in which torch 110 is used, throughout a wide range of operating temperatures, including relatively cold temperatures, for example, minus 40° F. and lower.

The combination of O-rings 189 and 190 can also enhance the stability of the regulator valve actuating device 138 as it moves within the regulator chamber 132, which can enhance the stability of the flame discharging from the burn tube 150 of torch 110. For example, the combination of the O-rings 189 and 190 can prevent the regulator valve actuating device 138 from being "cocked", or axially misaligned, within the regulator chamber 132, which could prevent, or at least inhibit, movement of the regulator valve actuating device 138 within the regulator chamber 132. Such misalignment could result in inconsistent regulation of the pressure of the hydrocarbon fuel downstream of the pressure regulator 116, which could cause inconsistency of hydrocarbon fuel flow, which in turn could cause instability in the height and intensity of the flame discharging from the burn tube 150 of torch 110.

When a source of hydrocarbon fuel, e.g., a cylindrical tank containing gaseous hydrocarbon fuel such as propane or propylene, is connected to the fuel inlet connector 120, the intake stem 122 can open a valve within the source of hydrocarbon fuel, which can permit the fuel to flow into the intake flow passage 124. The regulator valve 136 can be closed when the trigger 168 is in the off position, and the valve housing 180 of the regulator valve 136 can be disposed in sealing engagement with the regulator housing 130. As a result, the intake flow passage 124 and the fuel outlet zone 142 can be fluidicly uncoupled when the trigger 168 is in the off position.

A user of torch 110 can initiate the flow of hydrocarbon fuel to the fuel outlet zone 142, and to the burn tube flow passage 152, by depressing the trigger 168 and pivoting the trigger 168 away from the off position toward the full flow position. Additionally, the user can vary the flow rate of hydrocarbon fuel to the burn tube flow passage 152, and therefore the size of the flame of torch 110, throughout the range of positions of the trigger 168, by depressing and pivoting trigger 168 to the desired position. Pivotal movement of the trigger 168 toward the full flow position can open the regulator valve 136, by a continuously increasing amount, which can permit the fuel to flow from the intake flow passage 124, through the valve flow passage 182 to the fuel outlet zone 142. The fuel can then flow through the conduit flow passage 162, the coupler flow passage 156, and a flow passage defined by the valve 158, to the burn tube flow passage 152. The size of the flame of torch 110 can continuously, or substantially continuously, increase as the trigger 168 pivots toward the full flow position. Similarly, the flow rate of hydrocarbon fuel to the burn tube flow passage 152, and the size of the flame of torch 110, can be reduced by releasing the trigger 168, or applying less force to the trigger 168, so that the trigger 168 pivots toward the off position. The regulator spring 172 and the igniter spring 174 can combine to urge the trigger 168 toward the off position.

The fuel pressure within the intake flow passage 124 can vary with parameters that can include the fuel pressure within the source of hydrocarbon fuel. Use of some conventional sources of hydrocarbon fuel can result in the fuel pressure within the intake flow passage 124 being about 110 psig at 73.4° F. (23° C.).

The extent of the opening of the regulator valve 136 and the fuel pressure within the fuel outlet zone 142 can depend upon several factors, which can include: the fuel pressure within the intake flow passage 124; the characteristics of a resilient member (not shown), which can be within the regulator chamber 132 to bias the valve 136 to a closed position; the position of the trigger 168; the spring constant of the regulator spring 172; the spring constant of the actuator spring 186; the frictional engagement of the O-rings 189 and 190 with the regulator housing 130; and the "back pressure" created by a flow restriction in the coupler 154, for example, a flow restriction within the valve 158. As the regulator valve 136 opens, the fuel pressure within the fuel outlet zone 142 can increase until the force exerted on the regulator valve actuating device 138 momentarily equals the force exerted on the regulator valve actuating device 138 by the regulator spring 172. This can result in a corresponding fuel pressure and flow rate to the burn tube flow passage 152, and size of the flame of torch 110. The pressure within the fuel outlet zone 142 can then increase until the force exerted on the regulator valve actuating device 138 as a result of this pressure exceeds the force exerted on the regulator valve actuating device 138 by the regulator spring 172, which can permit the regulator valve 136 to close, stopping the flow of hydrocarbon fuel for an instant, which can have a negligible, indiscernible effect on the size of the flame of torch 110. As hydrocarbon fuel flows through the burn tube flow passage 152, the fuel pressure within the fuel outlet zone 142 can decrease to an extent that the regulator valve 136 opens again, and the flow of hydrocarbon fuel resumes. This cyclical process occurs in a very brief period of time such that the interruption of hydrocarbon fuel flow can be negligible, and can result in a continuous, or substantially continuous, increase in the size of the flame of torch 110 as the trigger 168 is pivoted toward the open position. A similar cyclical process can occur when the trigger 168 is pivoted toward the off position, resulting in a decrease in the size of the flame of torch 110.

The pivotal movement of the trigger 168 can also compress the igniter spring 174 of the trigger assembly 166, which can actuate the igniter 118. The torch 110 can include a wire 119 which can be disposed, at least partially, within the burn tube flow passage 152, and which can be electrically coupled with the igniter 118. Actuation of the igniter 118 can cause an electric arc between the wire 119 and the burn tube 150, causing hydrocarbon fuel within the burn tube flow passage 152 to ignite. The regulator spring 172 and the igniter spring 174 can be sized so that the fuel is ignited with the initiation of hydrocarbon fuel flow through the burn tube flow passage 152.

The torch 110 can be configured to avoid, or at least minimize, any leakage of hydrocarbon fuel to the environment in which the torch 110 is being used. For example, in addition to the materials of the first O-ring 189 and the second O-ring 190, and the sealing engagement of the first O-ring 189 and the second O-ring 190 with regulator housing 130, the regulator spring 172 can be sized so that it is spaced from the regulator valve actuating device 138 by a gap, which can be relatively small, or to contact the regulator spring 172, but with insufficient force to move the regulator valve actuating device 138, when the trigger 168 is in the off position. This can facilitate maintaining the regulator valve 136 in a closed position by preventing the regulator valve actuating device 138 from urging the proximal end 185 of the valve plunger 184 away from the valve housing 180. Additionally, the actuator spring 186 can be sized so that it urges the regulator valve actuating device 138 away from the valve plunger 184 of the regulator valve 136 to create a gap, which can be a relatively small gap, between the regulator valve actuating device 138 and the valve plunger 184, when the trigger 168 is the off position, to further facilitate maintaining the regulator valve 136 in a closed position. In other embodiments, the regulator valve actuating device 138 can contact the valve plunger 184 when the trigger 168 is in the off position, but with insufficient force to open the regulator valve 136.

FIGS. 18-25 illustrate a torch 210 according to another embodiment. The torch 210 can include a regulator 216 and a regulator valve actuating device 238, which can be different than the regulator 16 and regulator valve actuating device 38 of torch 10, but the torch 210 can be otherwise the same as, or similar to, the torch 10. Torch 210 can include a body 212, which can define an interior cavity 214 and a body longitudinal axis 215. The torch 210 can also include an igniter 218 and a fuel inlet connector 220, and each can be disposed within the interior cavity 214. Torch 210 can include a burn tube 250, which can define a burn tube flow passage 252, and can be coupled with the body 212 with a coupler 254 (FIGS. 21-24), which can define a coupler flow passage 256 (FIGS. 22-24) in fluid communication with the burn tube flow passage 252. The burn tube 250 can also define a plurality of apertures 253 (FIGS. 18, 21 and 23), which are in fluid communication with the burn tube flow passage 252. During operation of the torch 210, air can be aspirated into the burn tube flow passage 252 through the apertures 253.

The regulator 216 can include a regulator housing 230, which can define a regulator chamber 232 and a regulator longitudinal axis 234. The regulator longitudinal axis 234 can extend transversely to the body longitudinal axis 215. The regulator 216 can include a regulator valve 236, which can be normally closed, and a regulator valve actuating device 238 (FIGS. 21-24). The regulator valve 236 and at least a substantial portion of the regulator valve actuating device 238 can be disposed within the regulator chamber 232. The regulator chamber 232 can include a fuel inlet zone 240 (FIGS. 22-24) and a fuel outlet zone 242, which can be in selective fluid communication with one another. The fuel inlet zone 240 can be in selective fluid communication with a source of hydrocarbon fuel. The torch 210 can include a first conduit 244, which can define a first conduit flow passage 246. The first conduit flow passage 246 can be in fluid communication with each of the fuel inlet zone 240 and an intake flow passage 224 defined by an intake stem 222 secured to the fuel inlet connector 220. The intake stem 222 can extend through a connector cavity 221 defined by the fuel inlet connector 220. The intake flow passage 224 can be in fluid communication with an interior chamber defined by a source of hydrocarbon fuel (not shown), when the fuel inlet connector 220 is connected to the source of hydrocarbon fuel.

Torch 210 can include a second conduit 260 that can extend between the regulator housing 230 and the coupler 254. The second conduit 260 can define a second conduit flow passage 262, which can be in fluid communication with each one of the fuel outlet zone 242 and the coupler flow passage 256, which can provide, or establish, fluid communication between the fuel outlet zone 242 and the burn tube flow passage 252.

The torch 210 can include a trigger assembly 266, which can include a trigger 268. The trigger 268 can be pivotally coupled with the body 212, e.g., with a pin 270, and can be pivotable between an off position, shown in FIGS. 21 and 22, and a full flow position shown in FIGS. 23 and 24. In other embodiments, the trigger 268 and the body 212 can be configured so that the trigger 268 can translate, rather than pivot, relative to the body 212, between an off position and a full flow position. The trigger assembly 266 can also include a regulator spring 272 and an igniter spring 274. Each of the regulator spring 272 and the igniter spring 274 can be a coil spring, and each can be connected to the trigger 268 as shown in FIGS. 21-24.

The regulator valve 236 can include a valve housing 280 and can be disposed within the regular chamber 232. The regulator valve 236 can include a plunger 284 (FIGS. 22-24), which can be movable within a valve flow passage 282 defined by the valve housing 280. The regulator valve 236 can be in a closed position when the trigger 268 is in the off position, and can be in an open position when the trigger 268 is in the full flow position. When the regulator valve 236 is closed, the fuel inlet zone 240 and the fuel outlet zone 242 can be fluidicly uncoupled. When the regulator valve 236 is open, the fuel inlet zone 240 and the fuel outlet zone 242 can be in fluid communication. The fuel outlet zone 242 can be in fluid communication with the burn tube flow passage 252 via the second conduit flow passage 262, the coupler flow passage 256, and a flow passage defined by a valve 258 disposed within the coupler flow passage 256.

Figure 22:
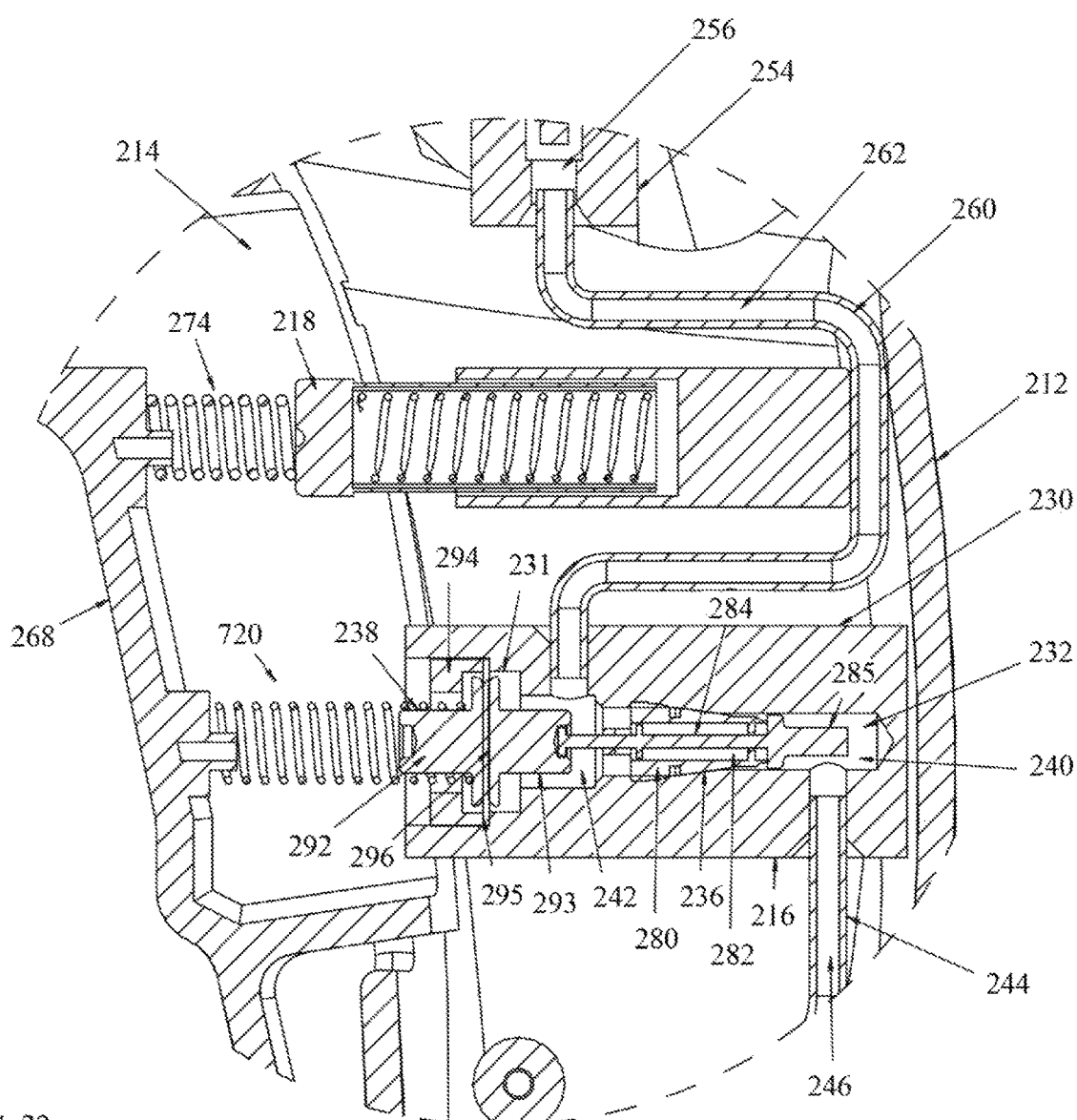
FIG. 22 is an enlarged view of an encircled portion of FIG. 21.
Figure 23:
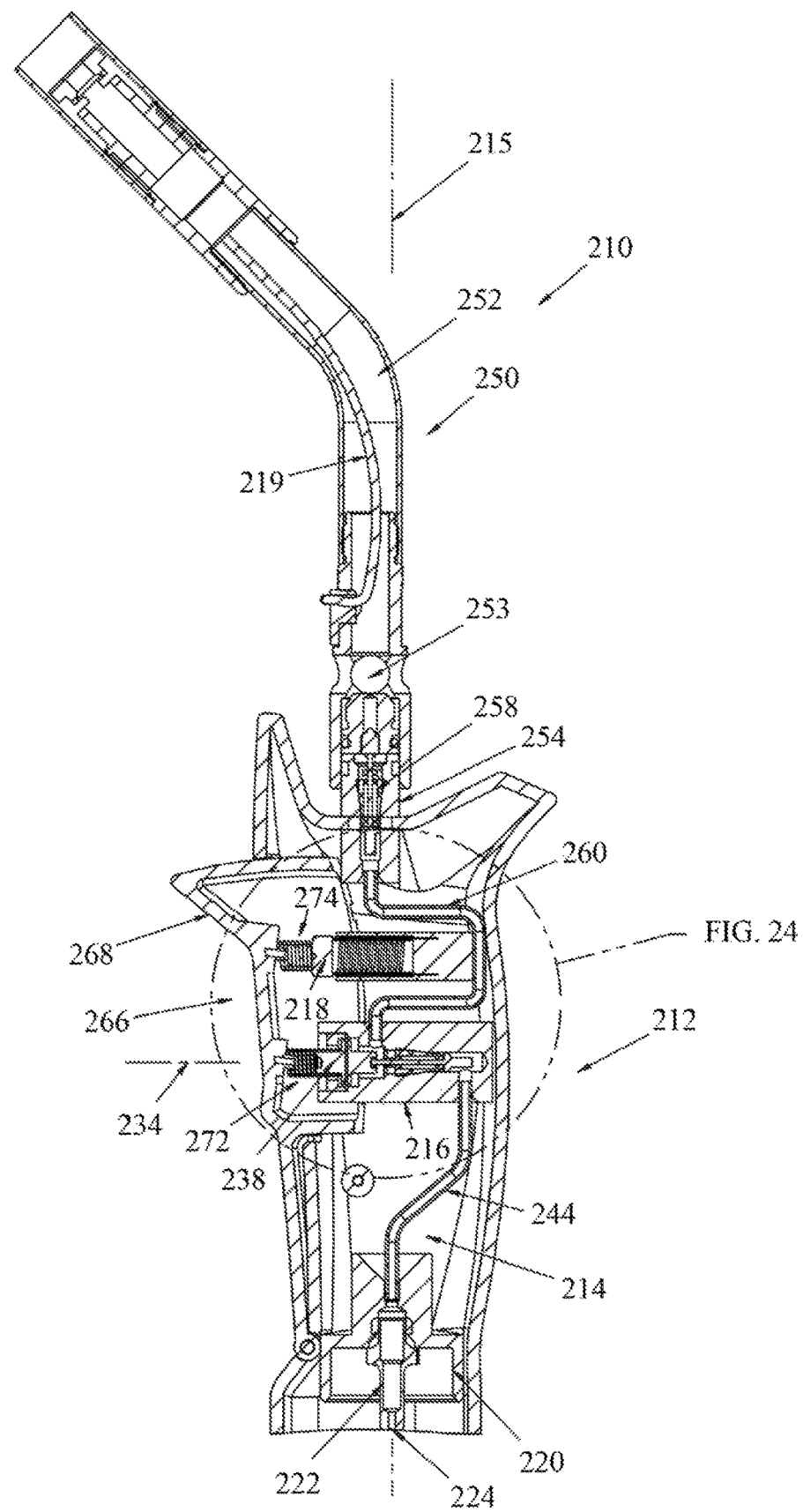
FIG. 23 is a cross-sectional view similar to FIG. 21, but with the trigger depicted in a full flow position.
Figure 24:
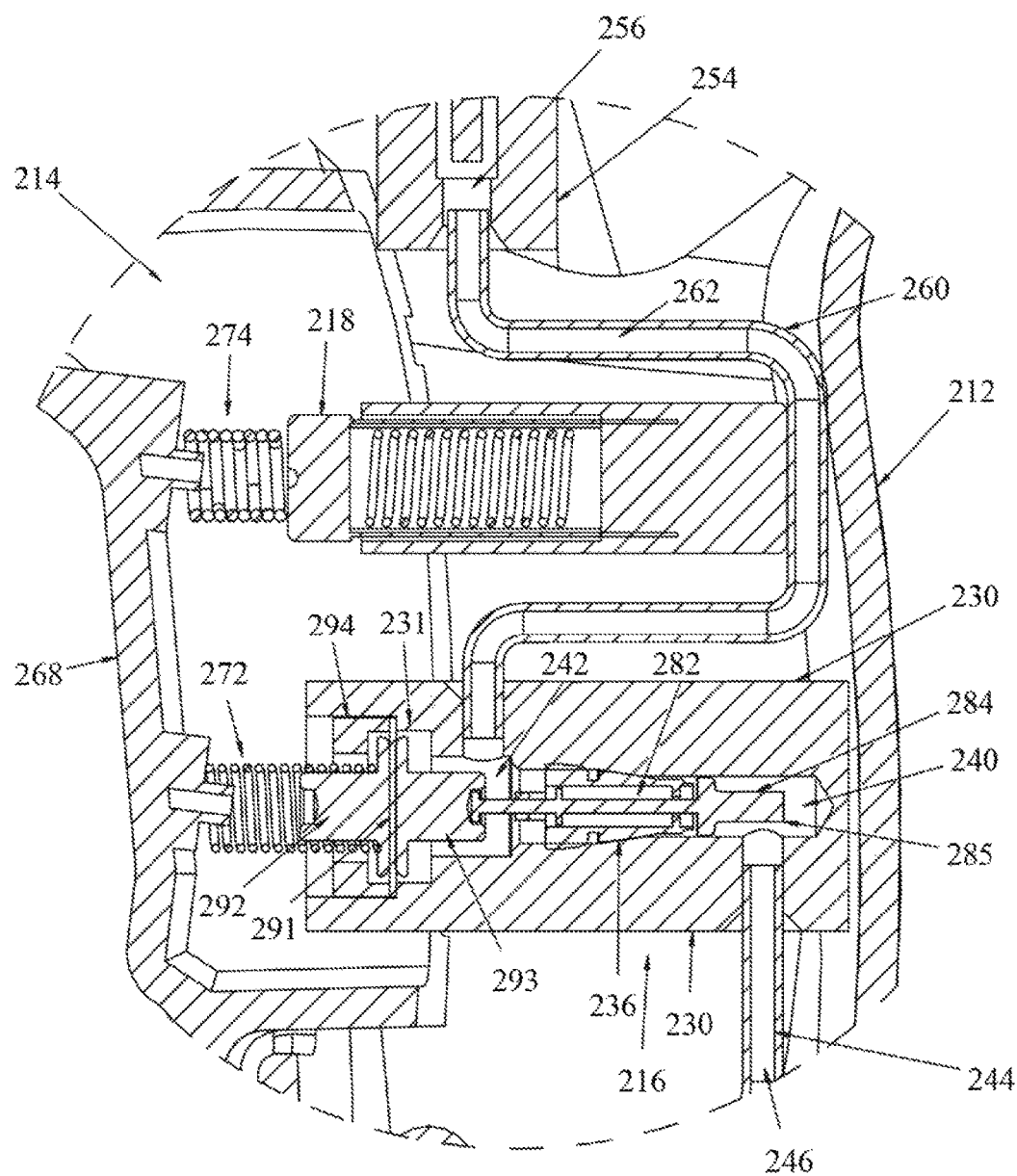
FIG. 24 is an enlarged view of an encircled portion of FIG. 23.
Figure 25:
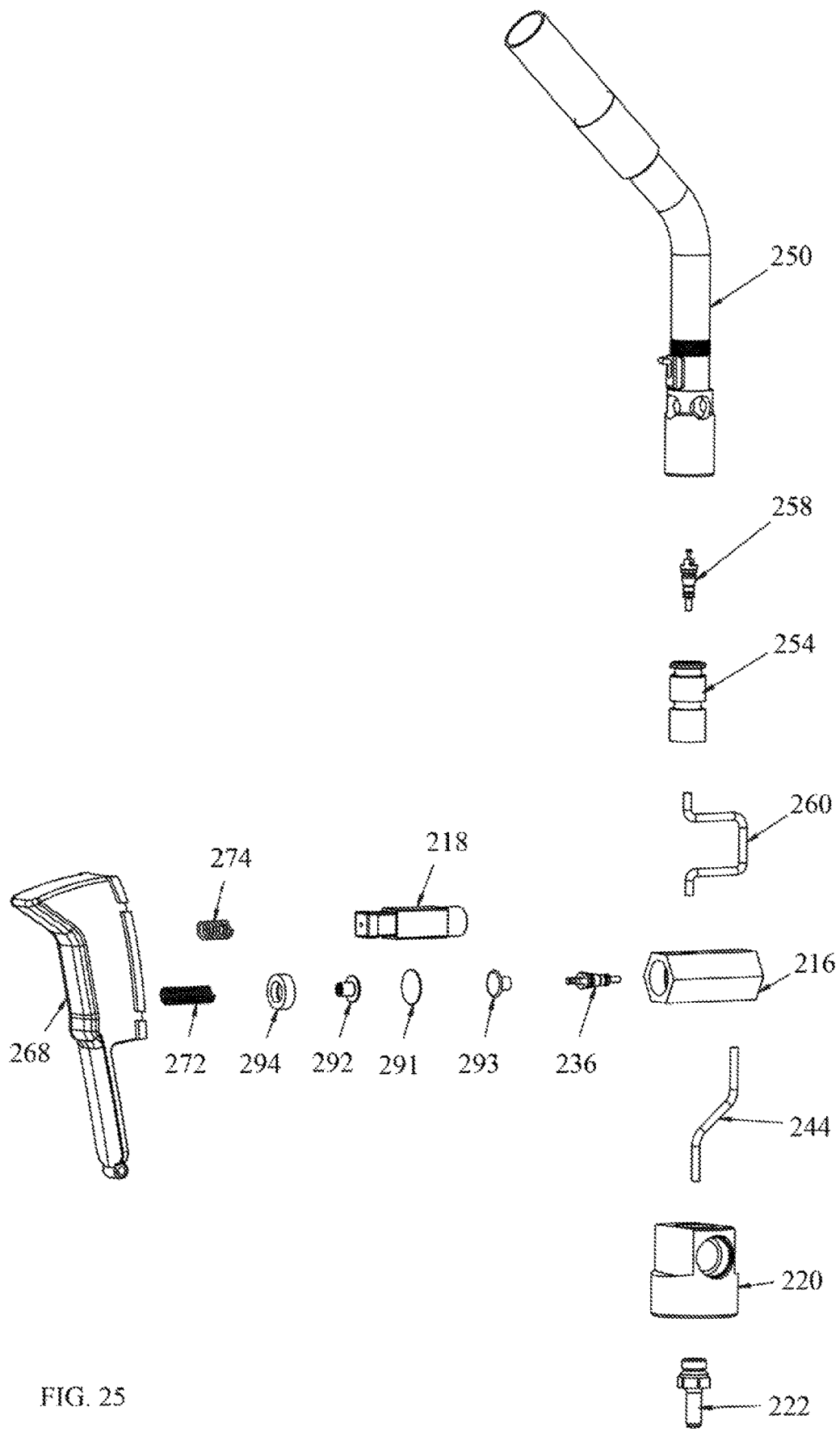
FIG. 25 is an exploded perspective view of the torch of FIG. 18, with a body of the torch omitted.
Figure 26:
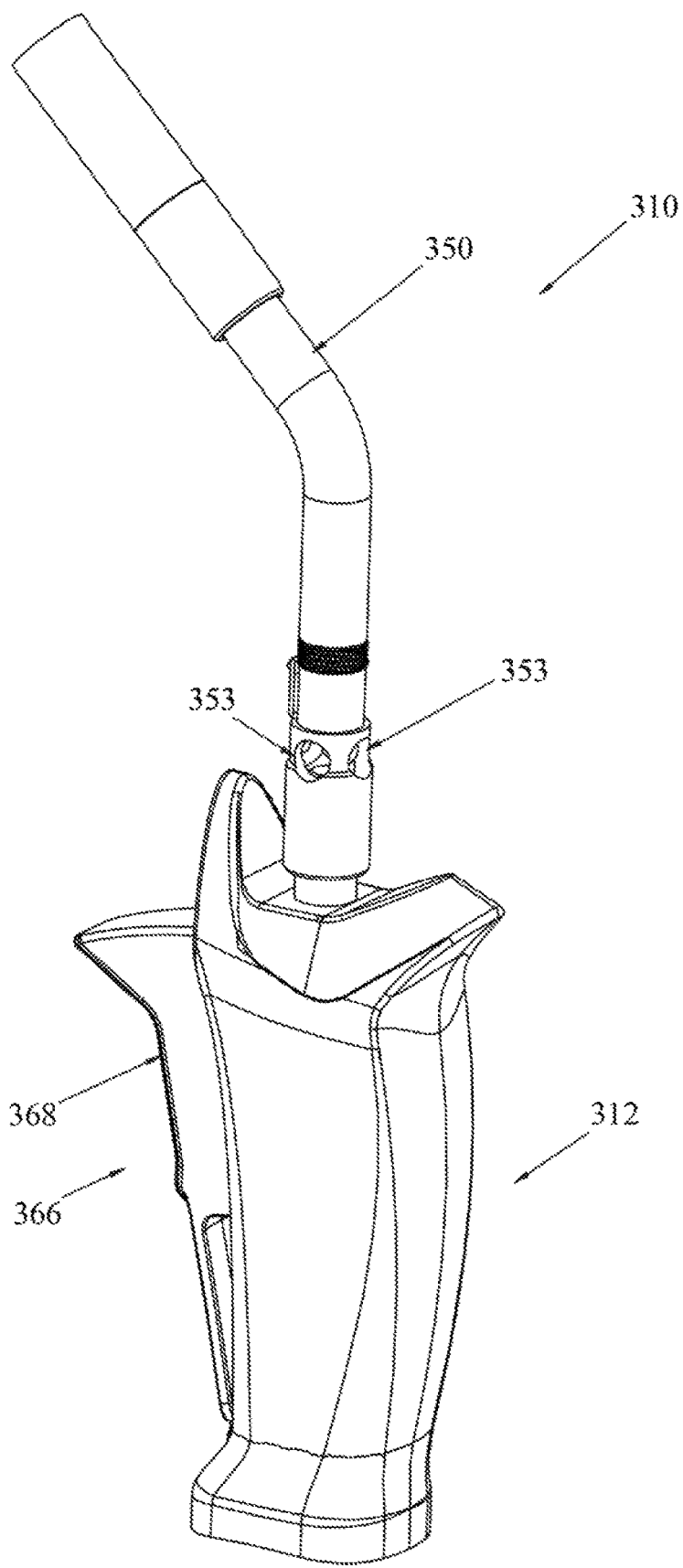
FIG. 26 is a perspective view of a torch according to another embodiment.
Figure 27:
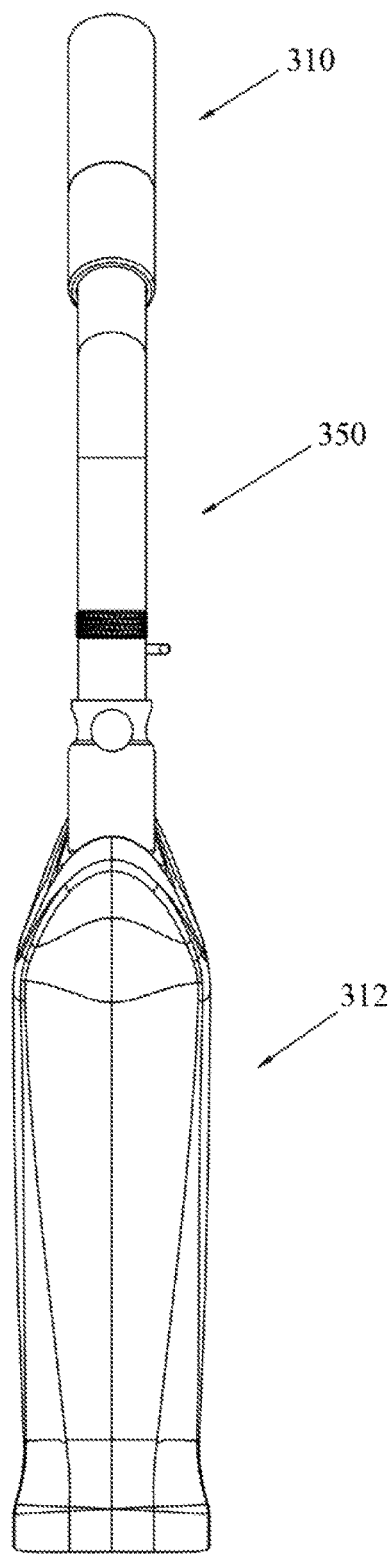
FIG. 27 is a top plan view of the torch of FIG. 26.
Figure 28:
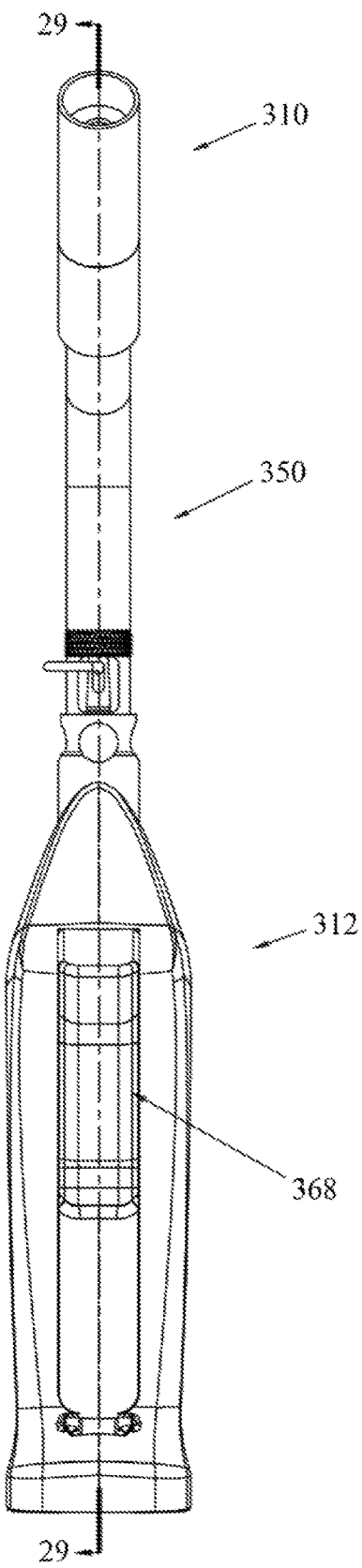
FIG. 28 is a bottom plan view of the torch of FIG. 26.
Figure 29:
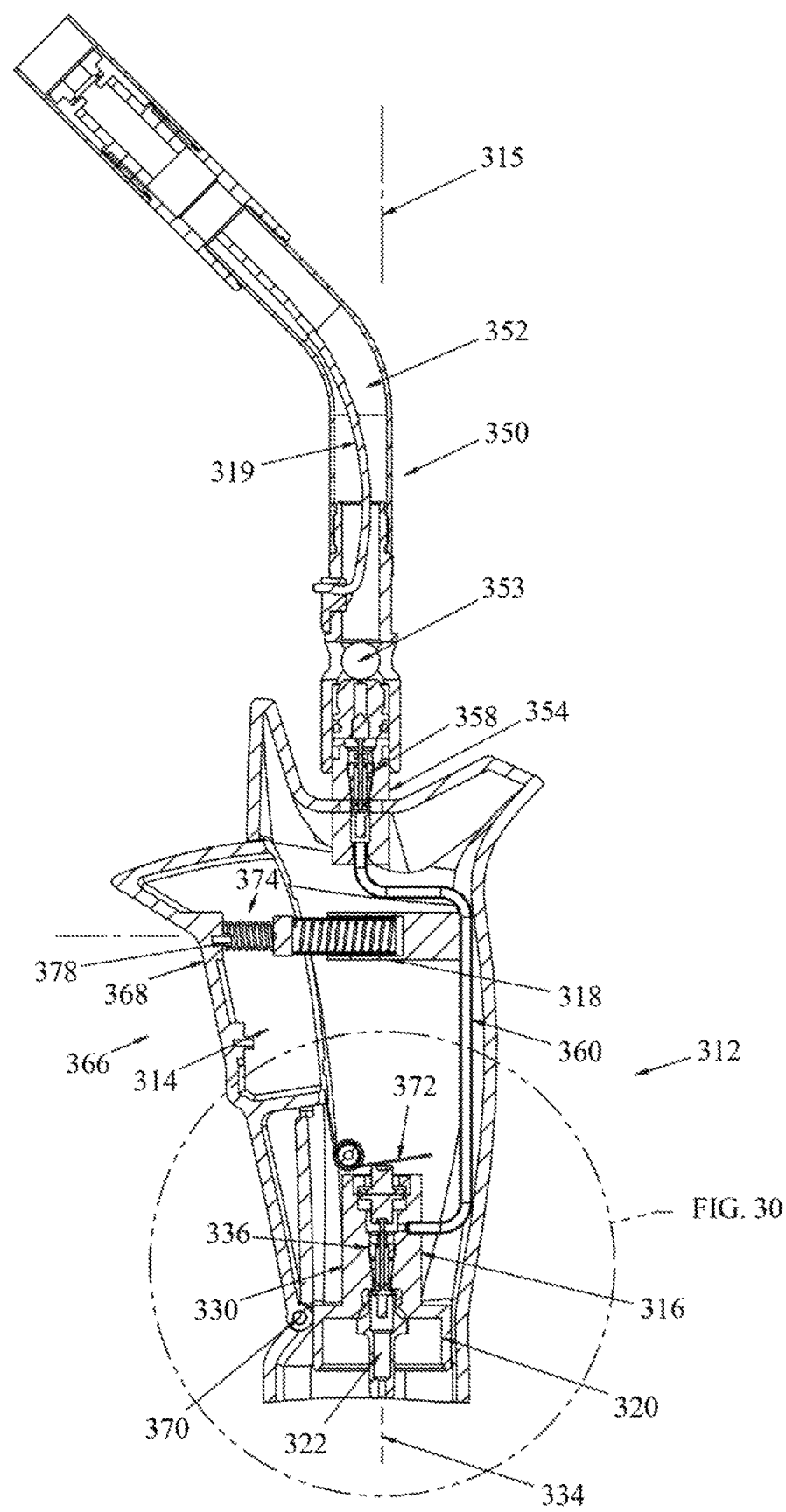
FIG. 29 is a cross-sectional view taken along line 29-29 in FIG. 28, with a trigger of the torch of FIG. 26 depicted in an off position.

The regulator valve actuating device 238 can be movable within the regulator chamber 232. The regulator housing 230 can define a shoulder 231 (FIGS. 22 and 24). The regulator valve actuating device 238 can include a diaphragm 291, a first diaphragm cap 292, a second diaphragm cap 293, and a regulator nut 294. The diaphragm 291, at least a substantial portion of the first diaphragm cap 292 (FIG. 24), the second diaphragm cap 293, and the regulator nut 294 can be disposed within the regulator chamber 232. The diaphragm 291 can include a radially outer portion 295 (FIG. 22) and a radially inner portion 296. The radially inner portion 296 of the diaphragm 291 can be "sandwiched" or captured between the first diaphragm cap 292 and the second diaphragm cap 293. The regulator nut 294 can threadedly engage the regulator housing 230, and can compress the radially outer portion 295 of the diaphragm 291 against the shoulder 231 of the regulator housing 230. This can provide a seal, which can prevent, or substantially prevent, fuel within the fuel outlet zone 242 during use of the torch 210 from leaking to the environment in which the torch 210 is used.

The diaphragm 291 can be made of an elastomeric material such that the diaphragm 291 can be flexible, which can permit the radially inner portion 296 of the diaphragm 291 to be movable with the first diaphragm cap 292 and the second diaphragm cap 293 within the regulator chamber 232. The elastomeric material can be a hydrocarbon-resistant material, which can prevent, or substantially prevent, degradation of the diaphragm 291 due to exposure to hydrocarbon fuel during use of the torch 210. For example, the diaphragm 291 can be made of a synthetic rubber fluoropolymer elastomer. The radially outer portion 295 of the diaphragm 291 can provide a static seal, since the radially outer portion 295 can remain stationary relative to the regulator housing 230, unlike the O-rings 89, 90 of the torch 10 and the O-rings 189, 190 of the torch 110, which can move relative to the regulator housing 30, 130 during use of the torches 10, 110. As a result, the use of a material which is resistant to low temperatures, may not be required because, even if the diaphragm 291 shrinks due to low temperature operation, a seal can be maintained. Each of the first diaphragm cap 292 and the second diaphragm cap 293 can define a recess. As shown in FIGS. 22 and 24, a distal end 299 of the valve plunger 284 can be disposed within the recess defined by the second diaphragm cap 293.

The regulator spring 272 can compress as the trigger 268 is pivoted toward the full flow position, and can exert a force on the first diaphragm cap 292, urging the first diaphragm cap 292 toward the fuel outlet zone 242. Due to the flexibility of the diaphragm 291, the first diaphragm cap 292 and the second diaphragm cap 293 can move within the regulator chamber 232. The second diaphragm cap 293 can contact the distal end 299 of the valve plunger 284, and can force the valve plunger 284 to move relative to the valve housing 280, such that the proximal end 285 (FIGS. 22 and 24) of the valve plunger 284 moves away from the valve housing 280, and the valve 236 opens.

When a source of hydrocarbon fuel, e.g., a cylindrical tank containing gaseous hydrocarbon fuel such as propane or propylene, is connected to the fuel inlet connector 220, a user of torch 210 can initiate the flow of fuel to the fuel outlet zone 242, and to the burn tube flow passage 252, by depressing the trigger 268 and pivoting the trigger 268 away from the off position toward the full flow position. Additionally, the user can vary the flow rate of hydrocarbon fuel to the burn tube flow passage 252, and therefore the size of the flame of torch 210, throughout the range of positions of the trigger 268, by pivoting trigger 268 to the desired position. Pivotal movement of the trigger 268 toward the full flow position can open the regulator valve 236, by a continuously increasing amount. This can permit the fuel to flow from the fuel inlet zone 240, through the valve flow passage 282 to the fuel outlet zone 242, through the second conduit flow passage 262, the coupler flow passage 256, and a flow passage defined by the valve 258, to the burn tube flow passage 252. The size of the flame of torch 210 can continuously increase, or substantially continuously increase, as the trigger 268 pivots toward the full flow position. Similarly, the flow rate of hydrocarbon fuel to the burn tube flow passage 252, and the size of the flame of torch 210, can be reduced by pivoting the trigger 268 toward the off position.

The pivotal movement of the trigger 268 can also compress the igniter spring 274 of the trigger assembly 266, which can actuate the igniter 218. The torch 210 can include a wire 219 which can be disposed, at least partially, within the burn tube flow passage 252, and can be electrically coupled with the igniter 218. Actuation of the igniter 218 can cause an electric arc between the wire 219 and the burn tube 250, causing hydrocarbon fuel within the burn tube flow passage 252 to ignite. The regulator spring 272 and the igniter spring 274 can be sized so that the fuel is ignited with the initiation of fuel flow through the burn tube flow passage 252.

FIGS. 26-33 illustrate a torch 310 according to another embodiment. Torch 310 can include a regulator 316, which can include regulator valve actuating device 338 (FIGS. 30 and 32), which can be different than the regulator 116 and regulator valve actuating device 138 of torch 110, but the torch 310 can be otherwise the same as, or similar to, the torch 110. Torch 310 can include a body 312 that can define an interior cavity 314 (FIGS. 29-32) and can define a longitudinal body axis 315. Torch 310 can also include a fuel inlet connector 320. The regulator 316 can include a regulator housing 330 that can be made as a unitary structure with the fuel inlet connector 320. The regulator 316 and the fuel inlet connector 320 can be disposed within the interior cavity 314. The fuel inlet connector 320 can be configured to be coupled with a source of hydrocarbon fuel containing a gas such as propane or propylene. The fuel inlet connector 320 can define a connector cavity 321. An intake stem 322 can be secured to the fuel inlet connector 320 and can extend through the connector cavity 321. The intake stem 322 can define an intake flow passage 324 and can be configured so that it opens a valve within a source of hydrocarbon fuel when the fuel inlet connector 320 is coupled with the source of hydrocarbon fuel, which can provide fluid communication between the intake flow passage 324 and the source of hydrocarbon fuel.

Figure 30:
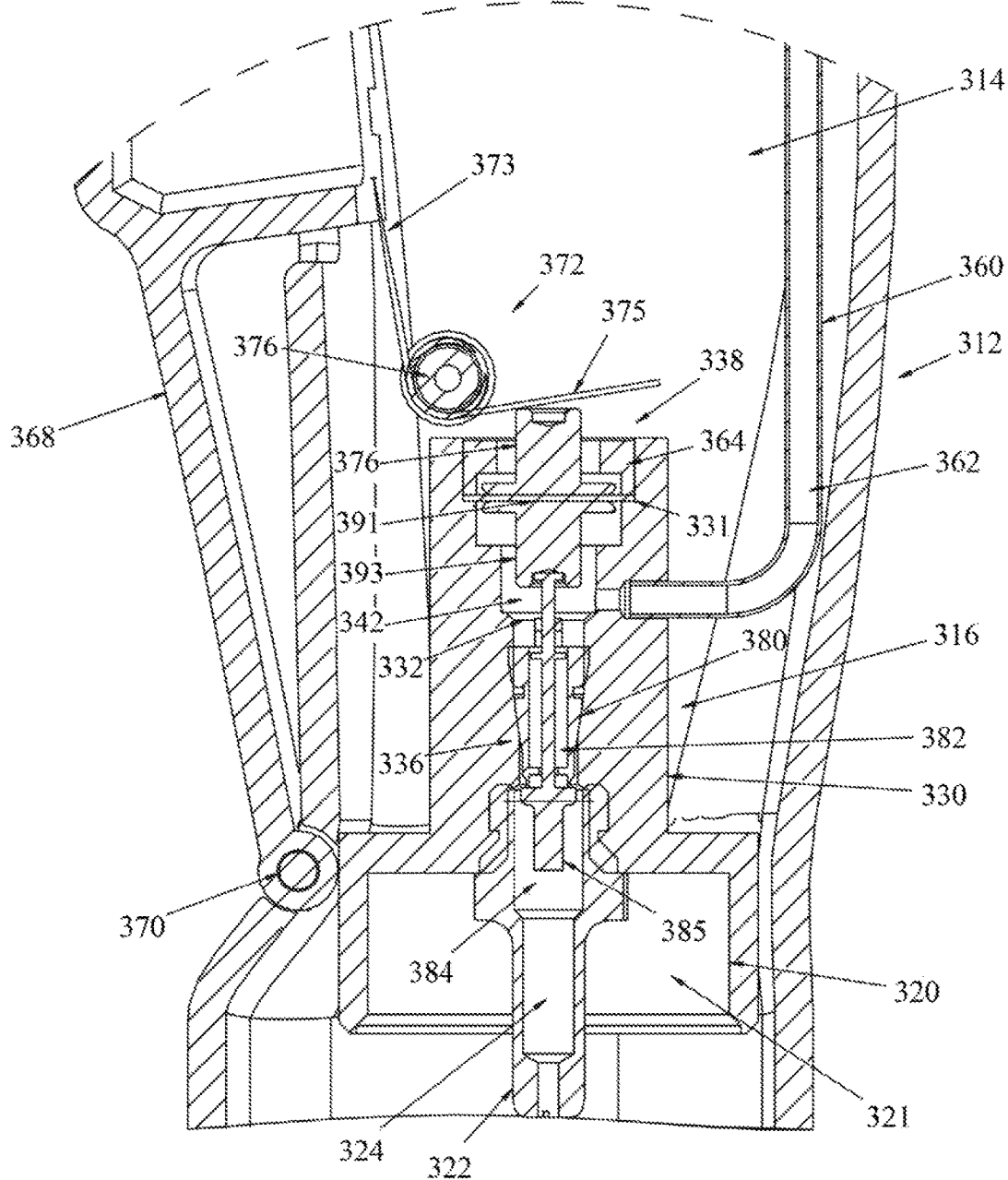
FIG. 30 is an enlarged view of an encircled portion of FIG. 29.
Figure 31:
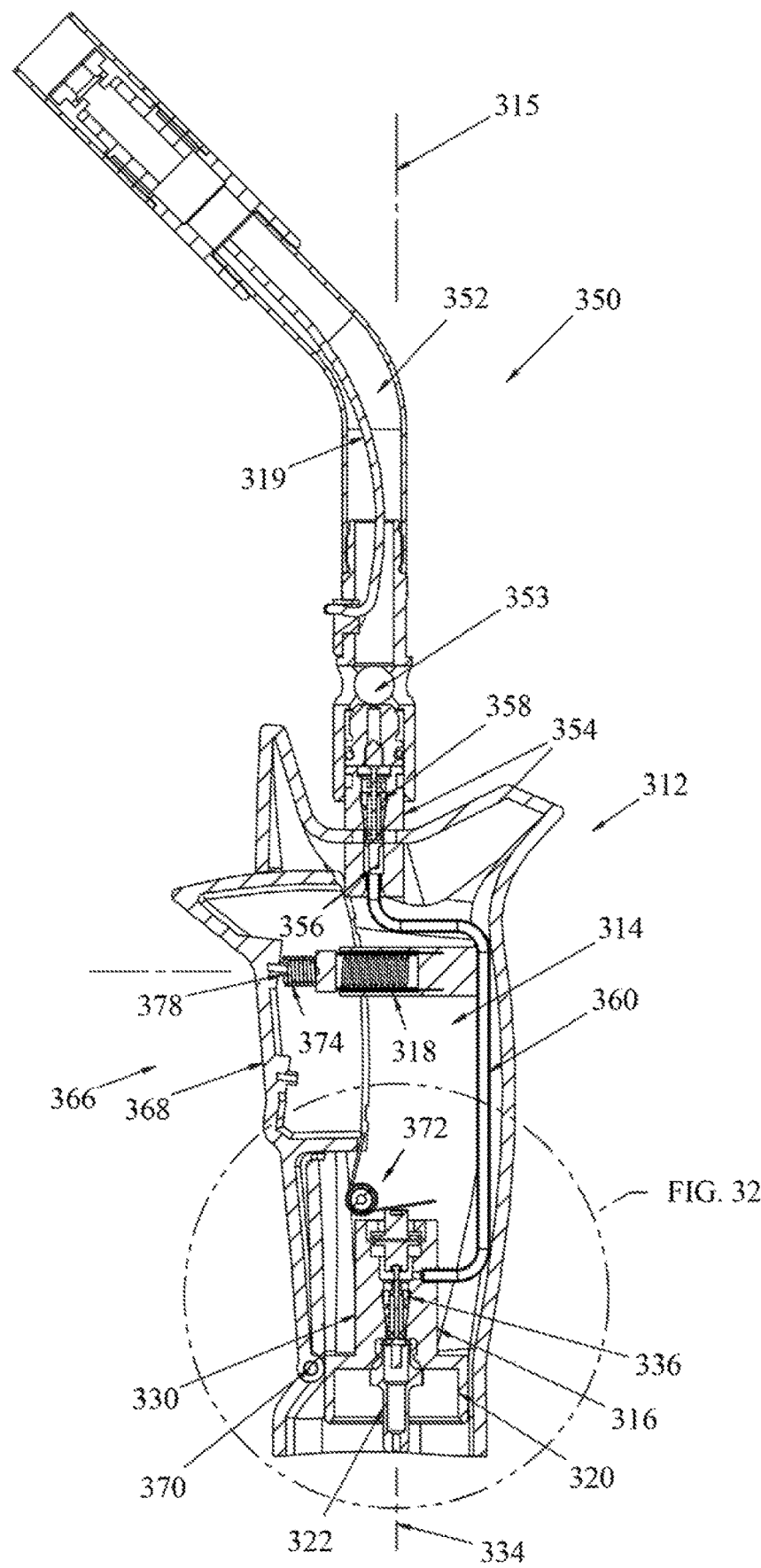
FIG. 31 is a cross-sectional view similar to FIG. 29, but with the trigger depicted in a full flow position.
Figure 32:
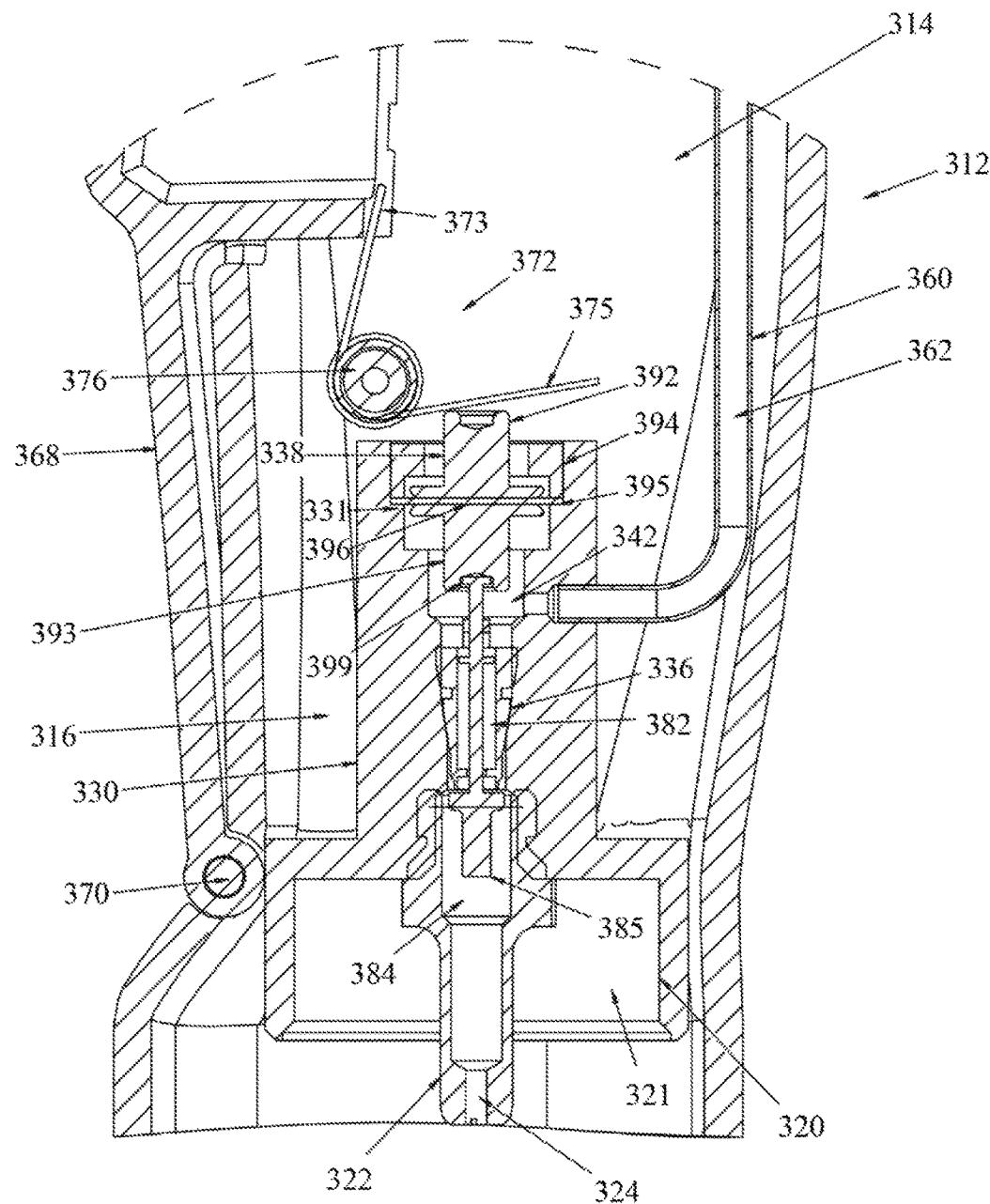
FIG. 32 is an enlarged view of an encircled portion of FIG. 31.
Figure 33:
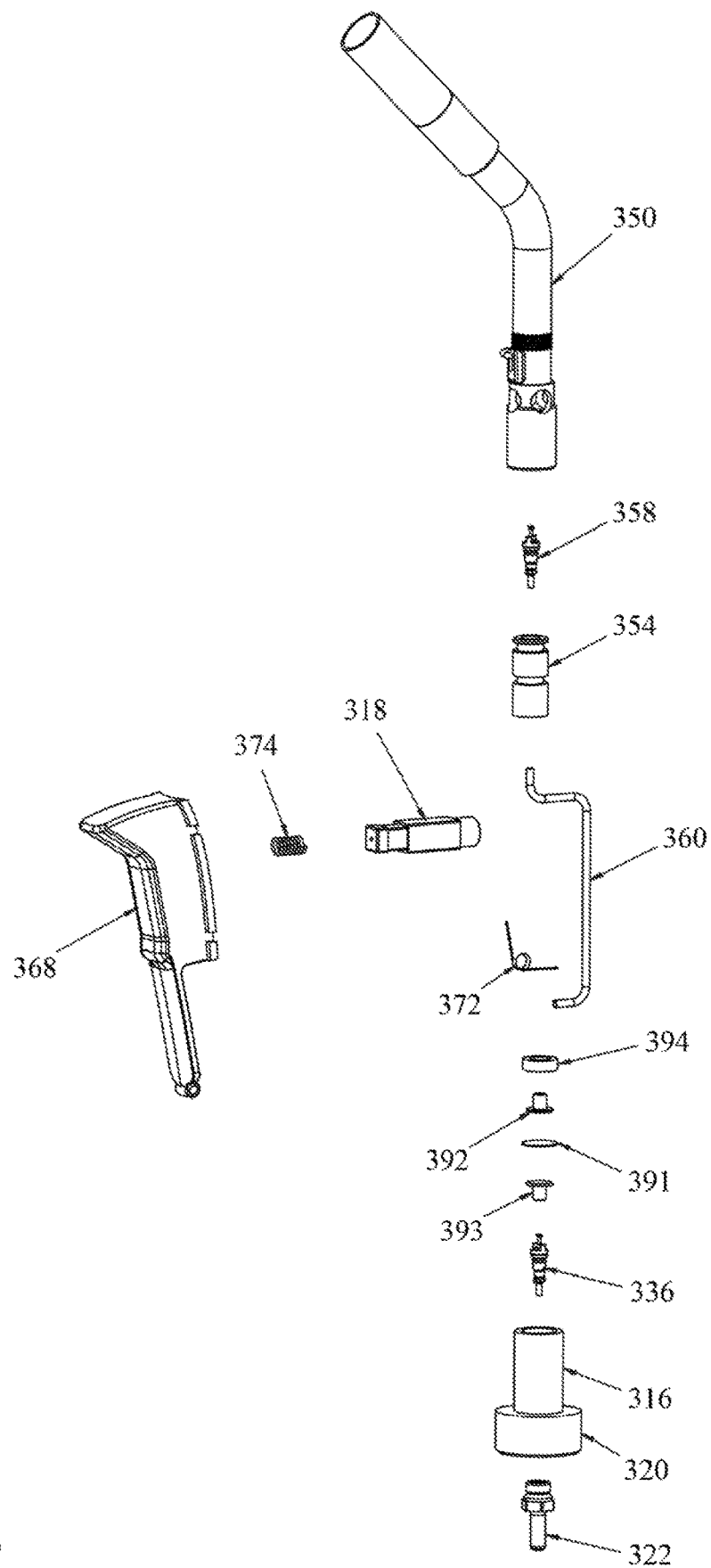
FIG. 33 is an exploded perspective view of the torch of FIG. 26, with a body of the torch omitted.

The regulator housing 330 can define a regulator chamber 332 (FIG. 30) and a regulator longitudinal axis 334 (FIG. 30). In the embodiment shown in FIGS. 26-33, the regulator longitudinal axis 334 can be parallel, or generally parallel, with the body longitudinal axis 315 (FIG. 31). The regulator 316 can also include a regulator valve 336, which can be normally closed. The regulator valve 336 can be disposed within the regulator chamber 332, and the regulator valve actuating device 338 can be at least partially disposed within the regulator chamber 332. The regulator chamber 332 can include a fuel outlet zone 342 (FIGS. 30 and 32), which can be in selective fluid communication with the intake flow passage 324.

The torch 310 can include a burn tube 350, which can be coupled with the body 312, and can define a burn tube flow passage 352. The burn tube 350 can also define a plurality of apertures 353 (FIGS. 26, 29 and 31), which are in fluid communication with the burn tube flow passage 352. During operation of the torch 310, air can be aspirated into the burn tube flow passage 352 through the apertures 353. The burn tube 350 can be coupled with the body 312 with a coupler 354, which can be attached to the body 312, e.g., with mating threads, and can be releasably attached to the burn tube 350, to facilitate replacing the burn tube 350 if required. The coupler 354 can define a coupler flow passage 356, and can include a valve 358 disposed within the coupler flow passage 356. The valve 358 can be configured the same as, or similar to, the valve 58 of torch 10, and can function the same as, or similar to, the valve 58.

Due to the unitary construction and orientation of the regulator 316 and the fuel inlet connector 320, the torch 310 can include a single conduit, e.g., a conduit 360, in lieu of two conduits, e.g., conduits 44, 60 and 244, 260 of torches 10, 210. As a result, torch 310 can have two less attachment joints, e.g., two less braze joints, relative to torches 10 and 210, which can simplify assembly and reduce costs. For example, the attachment joints of torches 10 and 210 associated with the first conduits 44 and 244 of torches 10 and 210, can be eliminated in torch 310. The conduit 360 can define a conduit flow passage 362, which can be in fluid communication with each of the fuel outlet zone 342 and the coupler flow passage 356 to provide fluid communication between the burn tube flow passage 352 and the fuel outlet zone 342.

The torch 310 can include an igniter 318 positioned within the interior cavity 314 and supported by support structure (not shown) of body 312, and can include a trigger assembly 366. The trigger assembly 366 can include a trigger 368, which can be pivotally coupled with the body 312, and can be pivotable between an off position, shown in FIGS. 29-30, and a full flow position, shown in FIGS. 31-32. The trigger 368 can be pivotably coupled with the body 312 via a pin 370, or other suitable pivot structure. In other embodiments, the trigger 368 and the body 312 can be configured so that the trigger 368 can translate, rather than pivot, relative to the body 312, between an off position and a full flow position. The trigger assembly 366 can also include a regulator spring 372 and an igniter spring 374. The body 312 can include a protrusion 376 and the trigger 368 can include a protrusion 378. Each of the protrusions 376 and 378 can extend into the interior cavity 314. The regulator spring 372 can be connected with the body 312 with the protrusion 376, and the igniter spring 374 can be connected to the trigger 368 with the protrusion 378. As shown in FIGS. 29-32, the regulator spring 372 can be a torsion spring, and the igniter spring 374 can be a coil spring. A first end 373 (FIGS. 30 and 32) of the regulator spring 372 can be in contacting engagement with the trigger 368, and can slide along the trigger 368, as the trigger 368 pivots from the off position toward the full flow position. A second end 375 (FIGS. 30 and 32) of the regulator spring 372 can be positioned adjacent to, but spaced from, the regulator valve actuating device 338 when the trigger is in the off position. In another embodiment, the second end 375 of the regulator spring 372 can contact the regulator valve actuating device 338, but with insufficient force to move the regulator valve actuating device 338 and open the valve 336 when the trigger 368 is in the off position. The second end 375 of the regulator spring 372 can be in contacting engagement with the regulator valve actuating device 338, as the trigger 368 pivots from the off position toward the full flow position.

The regulator valve 336 can include a valve housing 380 (FIG. 30) and can be disposed within the regular chamber 332. The regulator valve 336 can also include a valve plunger 384, which can be movable within a valve flow passage 382 defined by the valve housing 380. The valve plunger 384, and the regulator valve 336, can be in a closed position when the trigger 368 is in an off position, and can be in an open position when the trigger 368 is in the full flow position. When the regulator valve 336 is closed, the fuel outlet zone 342 and the intake flow passage 324 can be fluidicly uncoupled. When the regulator valve 336 is open, the fuel outlet zone 342 and the intake flow passage 324 can be in fluid communication, such that the intake flow passage 324 can be in fluid communication with the burn tube flow passage 352, via the valve flow passage 382, the fuel outlet zone 342, the conduit flow passage 362, the coupler flow passage 356, and a flow passage defined by the valve 358 disposed within the coupler flow passage 356.

The regulator valve actuating device 338 can be movable within the regulator chamber 332. The regulator housing 330 can define a shoulder 331. The regulator valve actuating device 338 can include a diaphragm 391, a first diaphragm cap 392, a second diaphragm cap 393, and a regulator nut 394. The diaphragm 391, at least a substantial portion of the first diaphragm cap 392, the second diaphragm cap 393, and the regulator nut 394 can be disposed within the regulator chamber 332. The diaphragm 391 can include a radially outer portion 395 (FIG. 32) and a radially inner portion 396. The regulator nut 394 can threadedly engage the regulator housing 330, and can compress the radially outer portion 395 of the diaphragm 391 against the shoulder 331 of the regulator housing 330. The radially inner portion 396 of the diaphragm 391 can be "sandwiched" or captured between the first diaphragm cap 392 and the second diaphragm cap 393. This can provide a seal, which can prevent, or substantially prevent, hydrocarbon fuel within the fuel outlet zone 342 during use of the torch 310 from leaking to the environment in which the torch 310 is used.

The diaphragm 391 can be made of an elastomeric material such that the diaphragm 391 can be flexible, which can permit the radially inner portion 396 of the diaphragm 391 to be movable with the first diaphragm cap 392 and the second diaphragm cap 393 within the regulator chamber 332. The elastomeric material can be a hydrocarbon-resistant material, which can prevent, or substantially prevent, degradation of the diaphragm 391 due to exposure to hydrocarbon fuel during use of the torch 310. For example, the diaphragm 391 can be made of a synthetic rubber fluoropolymer elastomer. The radially outer portion 395 of the diaphragm 391 can provide a static seal, since the radially outer portion 395 can remain stationary relative to the regulator housing 330, unlike the O-rings 89, 90 of the torch 10 and the O-rings 189, 190 of the torch 110, which can move relative to the regulator housing 30, 130 during use of the torches 10, 110. As a result, the use of a material which is resistant to low temperatures, may not be required because, even if the diaphragm 391 shrinks due to low temperature operation, a seal can be maintained. Each of the first diaphragm cap 392 and the second diaphragm cap 393 can define a recess. A distal end 399 (FIG. 32) of the valve plunger 384 can be disposed within the recess defined by the second diaphragm cap 393.

The regulator spring 372 can compress as the trigger 368 is pivoted toward the full flow position, and can exert a force on the first diaphragm cap 392, urging the first diaphragm cap 392 toward the fuel outlet zone 342. Due to the flexibility of the diaphragm 391, the first diaphragm cap 392 and the second diaphragm cap 393 can move within the regulator chamber 332. The second diaphragm cap 393 can contact the distal end 399 of the valve plunger 384, and can force the valve plunger 384 to move relative to the valve housing 380, such that the proximal end 385 of the valve plunger 384 moves away from the valve housing 380, and the valve 336 opens.

When a source of hydrocarbon fuel, e.g., a cylindrical tank containing gaseous hydrocarbon fuel such as propane or propylene, is connected to the fuel inlet connector 320, a user of torch 310 can initiate the flow of fuel to the fuel outlet zone 342, and to the burn tube flow passage 352, by depressing the trigger 368 and pivoting the trigger 368 away from the off position toward the full flow position. Additionally, the user can vary the flow rate of hydrocarbon fuel to the burn tube flow passage 352, and therefore the size of the flame of torch 310, throughout the range of positions of the trigger 368, by pivoting trigger 368 to the desired position. Pivotal movement of the trigger 368 toward the full flow position can open the regulator valve 336, by a continuously increasing amount, which can permit the hydrocarbon fuel to flow from the intake flow passage 324 to the burn tube flow passage 352. The size of the flame of torch 310 can continuously, or substantially continuously, increase as the trigger 368 pivots toward the full flow position. Similarly, the flow rate of hydrocarbon fuel to the burn tube flow passage 352, and the size of the flame of torch 310, can be reduced by pivoting the trigger 368 toward the off position.

The pivotal movement of the trigger 368 can also compress the igniter spring 374 of the trigger assembly 366, which can actuate the igniter 318. The torch 310 can include a wire 319 which can be disposed, at least partially, within the burn tube flow passage 352, and can be electrically coupled with the igniter 318. Actuation of the igniter 318 can cause an electric arc between the wire 319 and the burn tube 350, causing hydrocarbon fuel within the burn tube flow passage 352 to ignite. The regulator spring 372 and the igniter spring 374 can be sized and configured so that the hydrocarbon fuel is ignited with the initiation of fuel flow through the burn tube flow passage 352.

Use of torches 10, 110, 210 and 310 can result in various advantages that can include: ease of use due to ability to initiate and vary fuel flow, and therefore the size of the torch flame, with one hand; enhanced service life of the torches; more consistent operation, due to stability of the included regulator valve actuation device; enhanced ability to prevent leaks to the environment in which the torches are used; reduction in production development time, flexibility in the manufacturing process and the facilitation of automation, such that the manufacturing process is not labor intensive.

The ability to initiate the flow of hydrocarbon fuel and also to vary fuel flow, and therefore the size of the flame of the torch (e.g., 10, 110, 210 and 310), by depressing a trigger (e.g., 68, 168, 268 and 368) of a trigger assembly (e.g., 66, 166, 266 and 366), without adjusting a separate control device such as a rotatable knob used in some conventional torches, facilitates the ability of the user to hold and operate the torch safely with one hand. This eliminates the inconvenience and lost time experienced by the use of some conventional torches, due to the need to set down the item being heated, e.g., solder wire, in order to use both hands to hold the torch while depressing the trigger and adjusting a fuel flow controller such as a rotatable knob. This also eliminates the cost of the fuel flow controller. This ability can be provided, at least in part, by the use of the trigger assembly (e.g., 66, 166, 266 and 366) of the torch (e.g., 10, 110, 210 and 310), which can include a trigger (e.g., 68, 168, 268 and 368) that is movable relative to a body (e.g., 12, 112, 212 and 312) of the torch (e.g., 10, 110, 210 and 310), and a regulator spring (e.g., 72, 172, 272 and 372) that can be connected to the trigger (e.g., 68, 168, 268 and 368). The regulator spring (e.g., 72, 172, 272 and 372) can exert a variable force on a regulator valve actuation device (e.g., 38, 138, 238 and 338), as the trigger (e.g., 68, 168, 268 and 368) is pivoted between off and full flow positions. This can result in a variable flow of hydrocarbon fuel to a burn tube (e.g., 50, 150, 250 and 350) and a torch flame having a variable size.

The service lives of the torches 10, 110, 210 and 310 can be enhanced relative to the service lives of some conventional torches, for several reasons. Conventional torches include those having the ability to lock the torch in a low-flow condition. This can permit use of the particular conventional torch at a low profile flame, for extended periods of time, which can melt insulation of an igniter wire within the burn tube. In this event, an electrical circuit of the torch "grounds out" and there is no ignition spark. This problem can be avoided in torches 10, 110, 210 and 310, which do not include the ability to lock the torch in a low-flow condition.

A regulator valve actuating device (e.g., 38, 138) of a torch (e.g., 10, 110) can include a piston (e.g., 87, 187), a first O-ring (e.g., 89, 189) and a second O-ring (e.g., 90, 190). Each of the first O-ring (e.g., 89, 189) and the second O-ring (e.g., 90, 190) can surround the piston (e.g., 87, 187). The first O-ring (e.g., 89, 189) can be made of a hydrocarbon-resistant material, which can avoid degradation due to hydrocarbon fuel exposure during use. The second O-ring (e.g., 90, 190) can be made of a material that remains ductile throughout a wide range of operating temperatures, including very low temperatures, for example, minus 40° F. and lower.

Accordingly, the combination of the O-rings (e.g., 89, 90 and 189, 190) can enhance the service life of the torch (e.g., 10, 110), and can prevent, or at least substantially prevent, undesirable leakage of hydrocarbon fuel to the environment in which the torch is used. This can be accomplished by maintaining a seal between the regulator valve actuating device (e.g., 38, 138) and a regulator housing (e.g., 30, 130).

Conventional torches include those having a trigger that can activate a two-position, on/off valve that is downstream of a regulator of the torch. Components that are upstream of the on/off valve are exposed, or "soaked" in fuel continuously, which can degrade certain components. For example, O-rings exposed to hydrocarbon fuel continuously can plasticize, or become brittle, such that the O-rings do not seal and leaks occur. This problem can be avoided with use of torches 10 and 110, since fuel flow and pressure is controlled at the regulator (e.g., 16, 116) by the variable position trigger (e.g., 68, 168), and an upstream end of a regulator valve (e.g., 36, 136) can be sealed by a proximal end (e.g., 85, 185) of a plunger (e.g. 84 and 184) of the regulator valve. This can prevent, or at least substantially prevent, a first, or upstream O-ring (e.g., 89, 189) from being exposed to hydrocarbon fuel when the trigger (e.g., 68, 168) is in the off position and the torch (e.g., 10, 110) is not in use.

Torches 210 and 310 can include a regulator (e.g., 216, 316) and a fuel inlet connector (e.g., 220, 320) which are made, or manufactured, as a unitary construction. Torches 210, 310 can include a body (e.g., 212, 312) that can define an interior cavity (e.g., 214, 314) and a body longitudinal axis (e.g., 215, 315). A regulator (e.g., 216, 316) and a fuel inlet connector (e.g., 220, 320) can be disposed within the interior cavity (e.g., 214, 314) and oriented such that a regulator longitudinal axis (e.g., 234, 334) can be parallel to the body longitudinal axis (e.g., 215, 315). The position and orientation of the unitary structure that includes the regulator (e.g., 216, 316) and the fuel inlet connector (e.g., 220, 320) can eliminate a fuel conduit, e.g., 44, 144 of torches 10, 110 and the associated attachment joints, which can be braze joints. This can reduce material costs and assembly time, and can enhance the service life of each of the torches 210 and 310.

The regulator (e.g., 16, 116, 216 and 316) and regulator valve actuating device (e.g., 38, 138, 238 and 338) of the torch (e.g., 10, 110, 210 and 310) can allow for enhanced flexibility in the manufacturing process, and can reduce new product development time, labor costs and assembly. For example, if it is desirable to change a body, or outer shell, of a torch, it may not be necessary to change the regulator forging, unlike some conventional torches.

While various embodiments of a torch have been illustrated by the foregoing description and have been described in considerable detail, it is not intended to restrict or in any way limit the scope of the appended claims to such detail. Additional advantages and modifications will be readily apparent to those skilled in the art.

What is claimed is:

1. A torch comprising:
 a body defining an interior cavity;
 a fuel inlet connector secured to the body and disposed within the interior cavity;
 a regulator disposed within the interior cavity, the regulator comprising a regulator housing defining a regulator chamber, and further comprising a regulator valve and a regulator valve actuating device, each being disposed at least partially within the regulator chamber;
 an intake stem defining an intake flow passage, the intake stem being secured to one of the fuel inlet connector and the regulator housing:
 a burn tube coupled with the body and defining a burn tube flow passage; and
 a trigger assembly comprising a trigger pivotally coupled with the body, and a regulator spring connected to one of the trigger and the body, the trigger being pivotable between an off position and a full flow position; wherein
 the regulator chamber comprises a fuel outlet zone in selective fluid communication with the intake flow passage, the fuel outlet zone being in fluid communication with the burn tube flow passage; and the regulator spring urges the regulator valve actuating device against the regulator valve, to open the regulator valve, as the trigger pivots between the off position and the full flow position, permitting a user to initiate and vary a flow of hydrocarbon fuel to the burn tube flow passage when the intake flow passage is in fluid communication with a source of hydrocarbon fuel, by varying the position of the trigger.

2. The torch of claim 1, further comprising:

a first conduit defining a first conduit flow passage;

a second conduit defining a second conduit flow passage; wherein the regulator chamber further comprises a fuel inlet zone;

the first conduit flow passage is in fluid communication with the intake flow passage and the fuel inlet zone;

the second conduit flow passage is in fluid communication with the fuel outlet zone and the burn tube flow passage;

the regulator valve has a closed position and an open position; and the fuel inlet zone and the fuel outlet zone are fluidicly uncoupled when the regulator valve is in the closed position and are in fluid communication when the regulator valve is in the open position.

3. The torch of claim 2, wherein:

the regulator valve comprises a valve plunger movable relative to the regulator housing between a closed position and an open position; and the regulator valve actuating device is movable relative to the regulator housing and is disposed in a confronting relationship with the valve plunger.

4. The torch of claim 3, wherein:

the regulator valve comprises a valve housing disposed within the regulator chamber and in sealing engagement with the regulator housing, the valve housing defining a valve flow passage;

the valve plunger is at least partially disposed within the valve flow passage and is movable relative to the valve housing; and the valve plunger is biased toward the closed position.

5. The torch of claim 1, wherein:

the regulator spring is disposed in close proximity to, but spaced from, the regulator valve actuating device, when the trigger is in the off position.

6. The torch of claim 1, wherein:

the regulator valve actuating device comprises a piston.

7. The torch of claim 6, wherein:

the regulator valve actuating device further comprises a first O-ring and a second O-ring; and each of the first O-ring and the second O-ring surrounds the piston and is disposed in sealing engagement with the regulator housing.

8. The torch of claim 7, wherein:

the first O-ring comprises a first material and the second O-ring comprises a second material, the first material being different than the second material.

9. The torch of claim 6, wherein:

the regulator spring comprises a coil spring; and the body defines a body longitudinal axis and the regulator defines a regulator longitudinal axis extending transversely to the body longitudinal axis.

10. The torch of claim 1, wherein:

the regulator spring comprises a coil spring; and the body defines a body longitudinal axis and the regulator defines a regulator longitudinal axis extending transversely to the body longitudinal axis.

11. The torch of claim 1, further comprising:

an actuator spring disposed within the regulator chamber; wherein the actuator spring extends between the regulator housing and the regulator valve actuating device; and the actuator spring biases the regulator valve actuating device away from the regulator valve.

12. The torch of claim 1, further comprising:

an igniter; wherein the trigger assembly further comprises an igniter spring extending between the trigger and the igniter; and pivotal movement of the trigger from the off position toward the full flow position actuates the igniter, which operably ignites a hydrocarbon fuel within the burn tube flow passage when the intake flow passage is in fluid communication with a source of hydrocarbon fuel.

13. The torch of claim 1, further comprising:

a coupler attached to the body and defining a coupler flow passage; wherein the burn tube is coupled with the coupler; and the coupler flow passage is in fluid communication with the fuel outlet zone defined by the regulator housing and the burn tube flow passage defined by the burn tube.

14. A torch comprising:

a body defining an interior cavity;

a fuel inlet connector secured to the body and disposed within the interior cavity;

a regulator disposed within the interior cavity, the regulator comprising a regulator housing defining a regulator chamber, and further comprising a regulator valve and a regulator valve actuating device;

an intake stem defining an intake flow passage, the intake stem being secured to one of the fuel inlet connector and the regulator housing;

a burn tube coupled with the body and defining a burn tube flow passage; and a trigger assembly comprising a trigger pivotally coupled with the body, and pivotable between an off position and a full flow position; wherein the regulator chamber comprises a fuel outlet zone;

the fuel outlet zone is in selective fluid communication with the intake flow passage, the fuel outlet zone being in fluid communication with the burn tube flow passage;

the regulator valve actuating device comprises a piston, the regulator valve and the piston being disposed in a confronting relationship, the piston being movable relative to the regulator housing; and the regulator valve actuating device further comprises a first O-ring and a second O-ring, each of the first O-ring and the second O-ring surrounding the piston and being in sealing engagement with the regulator housing;

the piston is urged against the regulator valve, to open the regulator valve, as the trigger pivots between the off position and the full flow position, permitting a user to initiate and vary a flow of hydrocarbon fuel through the burn tube flow passage when the intake flow passage is in fluid communication with a source of hydrocarbon fuel, by varying the position of the trigger.

15. The torch of claim 14, wherein:

the first O-ring comprises a first material and the second O-ring comprises a second material that is different from the first material;

the first O-ring is in fluid communication with the fuel outlet zone and the first material comprises a hydrocarbon-resistant material.

\* \* \* \* \*